(12) United States Patent
Redmond

(10) Patent No.: US 7,399,325 B1
(45) Date of Patent: *Jul. 15, 2008

(54) METHOD AND APPARATUS FOR A HYDROGEN FUEL CASSETTE DISTRIBUTION AND RECOVERY SYSTEM

(75) Inventor: Scott D. Redmond, San Francisco, CA (US)

(73) Assignee: Fuelsell Technologies, Inc., San Francisco, CA (US)

( * ) Notice: Subject to any disclaimer, the term of this patent is extended or adjusted under 35 U.S.C. 154(b) by 1057 days.

This patent is subject to a terminal disclaimer.

(21) Appl. No.: 10/099,771

(22) Filed: Mar. 15, 2002

(51) Int. Cl.
*B01J 7/00* (2006.01)

(52) U.S. Cl. ............... 48/61; 48/65; 48/204; 422/211; 422/239; 700/266; 700/274

(58) Field of Classification Search ............ 48/61, 48/65, 204; 422/211, 239, 657, 658.3; 700/266, 700/274
See application file for complete search history.

(56) References Cited

U.S. PATENT DOCUMENTS

| | | | |
|---|---|---|---|
| 3,674,702 A | 7/1972 | MacKenzie et al. | |
| 3,932,600 A | 1/1976 | Gutbier et al. | |
| 3,977,990 A | 8/1976 | Beckert et al. | |
| 4,261,956 A * | 4/1981 | Adlhart | 422/239 |
| 4,468,854 A | 9/1984 | Chou et al. | |
| 4,497,973 A | 2/1985 | Heath et al. | |
| 4,546,740 A | 10/1985 | Clements et al. | |
| 4,684,751 A | 8/1987 | Trogler et al. | |
| 4,867,785 A | 9/1989 | Keem et al. | |
| 5,277,999 A | 1/1994 | Ovshinsky et al. | |
| 5,330,861 A | 7/1994 | Fetcenko et al. | |
| 5,411,815 A * | 5/1995 | Goldstein | 429/50 |
| 5,506,069 A | 4/1996 | Ovshinsky et al. | |
| 5,536,591 A | 7/1996 | Fetcenko et al. | |
| 5,554,456 A | 9/1996 | Ovshinsky et al. | |
| 5,557,254 A | 9/1996 | Johnson et al. | |
| 5,593,640 A * | 1/1997 | Long et al. | 422/111 |
| 5,616,432 A | 4/1997 | Ovshinsky et al. | |
| 5,654,115 A | 8/1997 | Hasebe et al. | |
| 5,702,491 A * | 12/1997 | Long et al. | 48/197 R |
| 5,728,464 A * | 3/1998 | Checketts | 428/403 |
| 5,780,701 A | 7/1998 | Kaska et al. | |
| 5,817,157 A * | 10/1998 | Checketts | 48/61 |
| 5,976,725 A * | 11/1999 | Gamo et al. | 429/25 |
| 6,045,933 A * | 4/2000 | Okamoto | 429/17 |
| 6,074,447 A * | 6/2000 | Jensen | 48/61 |

(Continued)

FOREIGN PATENT DOCUMENTS

WO PCT/US03/08298 3/2003

(Continued)

OTHER PUBLICATIONS

From Hydrogen Worldview, by Roger E. Billings, Chapter 5, Advanced Engine Conversion Direct Cylinder Injection. pp. 1-5.

(Continued)

*Primary Examiner*—N. Bhat
(74) *Attorney, Agent, or Firm*—Blakley, Sokoloff, Taylor & Zafman LLP

(57) ABSTRACT

A cassette-based hydrogen fuel distribution and recovery method and system is disclosed.

29 Claims, 19 Drawing Sheets

U.S. PATENT DOCUMENTS

| | | | |
|---|---|---|---|
| 6,139,302 | A | 10/2000 | Wood et al. |
| 6,221,310 | B1 | 4/2001 | Checketts et al. |
| 6,270,719 | B1 | 8/2001 | Fetcenko et al. |
| 6,372,377 | B1 | 4/2002 | Ovshinsky et al. |
| 6,413,670 | B1 | 7/2002 | Ovshinsky et al. |
| 6,461,766 | B1 | 10/2002 | Young et al. |
| 6,746,496 | B1 * | 6/2004 | Kravitz et al. .............. 48/118.5 |
| 6,811,764 | B2 * | 11/2004 | Jorgensen et al. ........ 423/658.2 |
| 6,869,585 | B2 * | 3/2005 | Otsuka et al. ............... 423/651 |
| 6,893,755 | B2 * | 5/2005 | Leboe .......................... 429/17 |
| 6,932,847 | B2 * | 8/2005 | Amendola et al. ............. 48/76 |
| 2002/0029820 | A1 | 3/2002 | Ovshinsky et al. |
| 2002/0073618 | A1 | 6/2002 | Ovshinsky et al. |
| 2003/0026757 | A1 | 2/2003 | Pecharsky et al. |
| 2004/0009121 | A1 | 1/2004 | Jensen et al. |
| 2004/0016769 | A1 | 1/2004 | Redmond |
| 2004/0023087 | A1 | 2/2004 | Redmond |

FOREIGN PATENT DOCUMENTS

WO  PCT/US03/19950  6/2003

OTHER PUBLICATIONS

From Hydrogen Worldview, by Roger E. Billings, Chapter 7, Hydrogen Stored As Metal Hydride The Safest Fuel on Earth. pp. 1-11.

From Hydrogen Worldview, by Roger E. Billings, Chapter 11, The Hydrogen Fuel Cell Efficiency if the Key. pp. 1-10.

F.E. Lynch. International Academay of Science—Hydrogen Tech Papers. 74001—Backfire Control Techniques For Hydrogen Fueled Internal Combustion Engines. [online] [retrieved on Aug. 18, 2003] Retrieved at http://www.science.edu/tech/h74001.htm. pp. 1-9.

Texaco Ovonic Hydorgen Solutions. N. Stetson et al., "Material Classification Regulations and their Impact on Reversible Metal Hydride Hydrogen Storage Systems", [online] Retrieved on Apr. 29, 2003. Retrieved from the Internet at: http://www.ovohi.com. pp. 1-18.

Texaco Ovonic Hydrogen Solutions.We help fuel imaginiations. [online] Retrieved on Apr. 29, 2003. Retrieved from the Internet at: http://www.ovonic.com/sol_srv/3_3_hydrogen_sol/hydrogen_sol.htm. pp. 1-8.

Texaco Ovonic Hydrogen Solutions. Ovonic Soild-State Hydrogen Bulk Storage System. [online] Retrieved on Apr. 29, 2003. Retrieved from the Internet at: http://www.ovonic.com/PDFs/HydrogenSpecSheet/ovonic_hydrogen_spec_032103.pdf. p. 1.

Dr. Rosa C. Young, Texaco Ovonic Hydrogen Systems, LLC. Advances of Solid Hydrogen Storage Systems. 14th Annual Conference of NHA, Mar. 4-6, 2003. pp. 1-16.

Arnold, Dr. Gerd, Advanced Hydrogen Storage Technologies, Global Alternative Propulsion Center (GAPC) GM, 10 pages.

Castelli, Brian, Chief of Staff to the Assistant Secretary of the Office of Energy Efficiency and Renewable Energy to The Attendees of the Coal to Hydrogen Workshop, Sep. 19, 2000, 10 pages.

Gross, K.J., et al., Hydride Development For Hydrogen Storage, Proceedings of the 2000 Hydrogen Program Review, NREL/CP-570-28890, 16 pages.

Niedzwiecki, Alan, Hydrogen Storage, Hydrogen Vision Meeting, Quantum Technologies WorldWide, Inc., Nov. 2001, 23 pages.

Chemistry 242-Inorganic Chemistry II, Chapter 9—Hydrogen, CHEM242-1999 Chapter 9 Course Notes, http://artsandscience.concordia.ca/facstaff/A-C/BIRD/c242/notes_ch9-cwp.html, Apr. 17, 2002, 6 pages.

Metal hydrides as hydrogen storage system for fuel cells, Fabien Nion-Carles Guillen Amigo, EEIGM projet 2001, Lulea Tekniska Universitet, 40 pages.

"Standard conditions for temperature and pressure,"retrieved from http://en.wikipedia.org/wiki/Standard_conditions_for_temperature_and_pressure, May 2, 2006, pp. 1-5.

Andrew W. McClaine et al., "Hydrogen Transmission/Storage with Metal Hydride-Organic Slurry and Advanced Chemical Hydride/Hydrogen for PEMFC Vehicles," Proceedings of the 2000 U.S DOE Hydrogen Program Review, NREL/CP-570-28890, 14 pages.

Tero Hottinen, "Technical Review and Economic Aspects of Hydrogen Storage Technologies," Espoo, Helsinki University of Technology, Department of Engineering Physics and Mathematics, Oct. 22, 2001, pp. 1-81.

Arnold, Dr. Gerd, Advanced Hydrogen Storage Technologies, Global Alternative Propulsion Center (GAPC) GM, 10 pages, 2002

From Hydrogen Worldview, by Roger E. Billings, Chapter 5, Advanced Engine Conversion Direct Cylinder Injection. pp. 1-5, 1991.

From Hydrogen Worldview, by Roger E. Billings, Chapter 7, Hydrogen Stored As Metal Hydride The Safest Fuel on Earth. pp. 1-11, 1991.

From Hydrogen Worldview, by Roger E. Billings, Chapter 11, The Hydrogen Fuel Cell Efficiency if the Key. pp. 1-10, 1991.

* cited by examiner

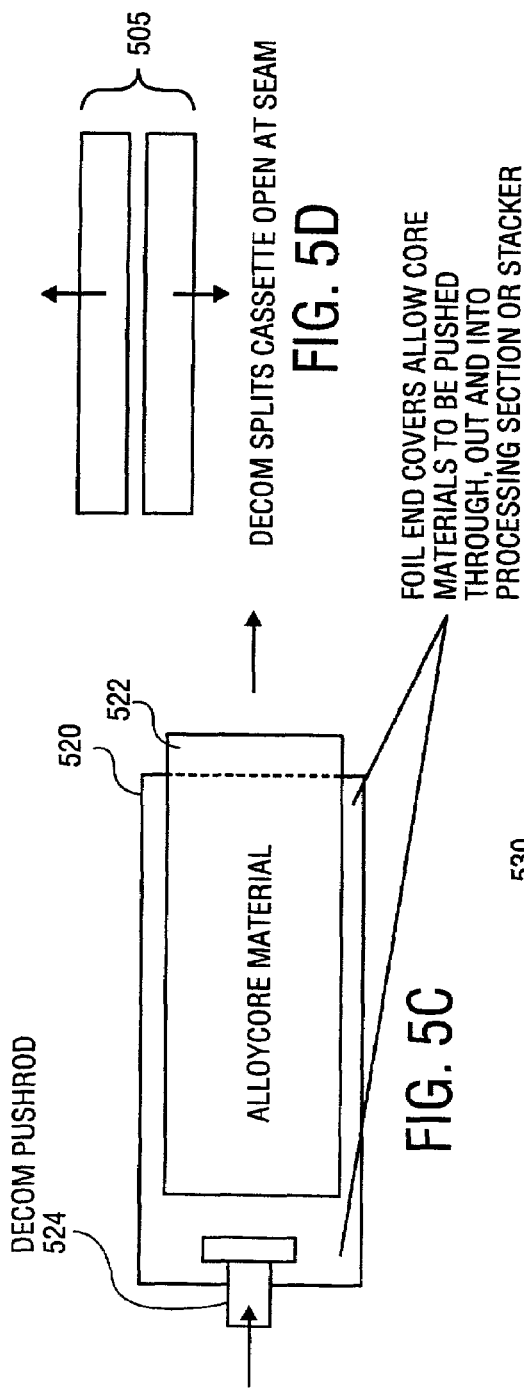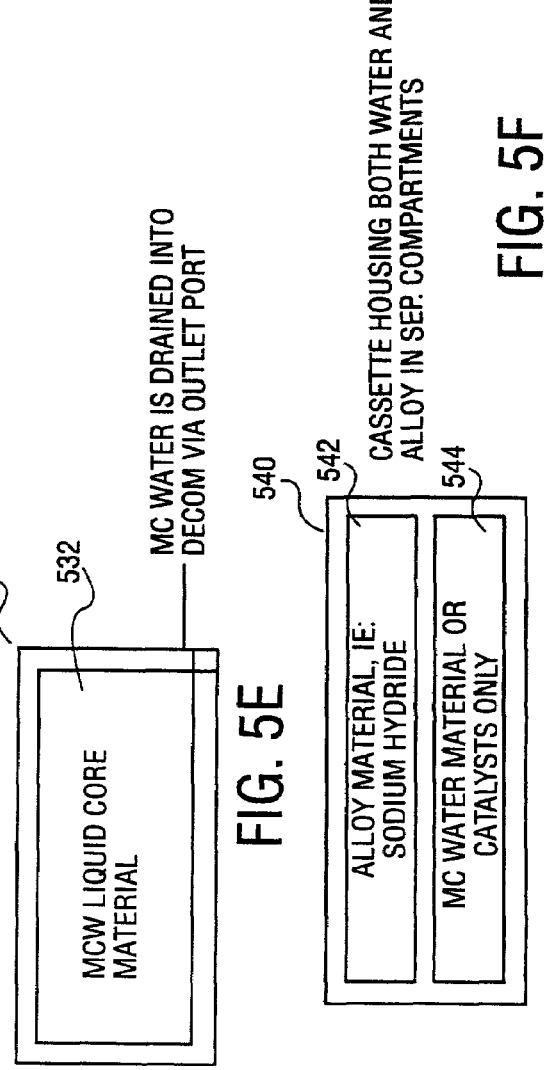

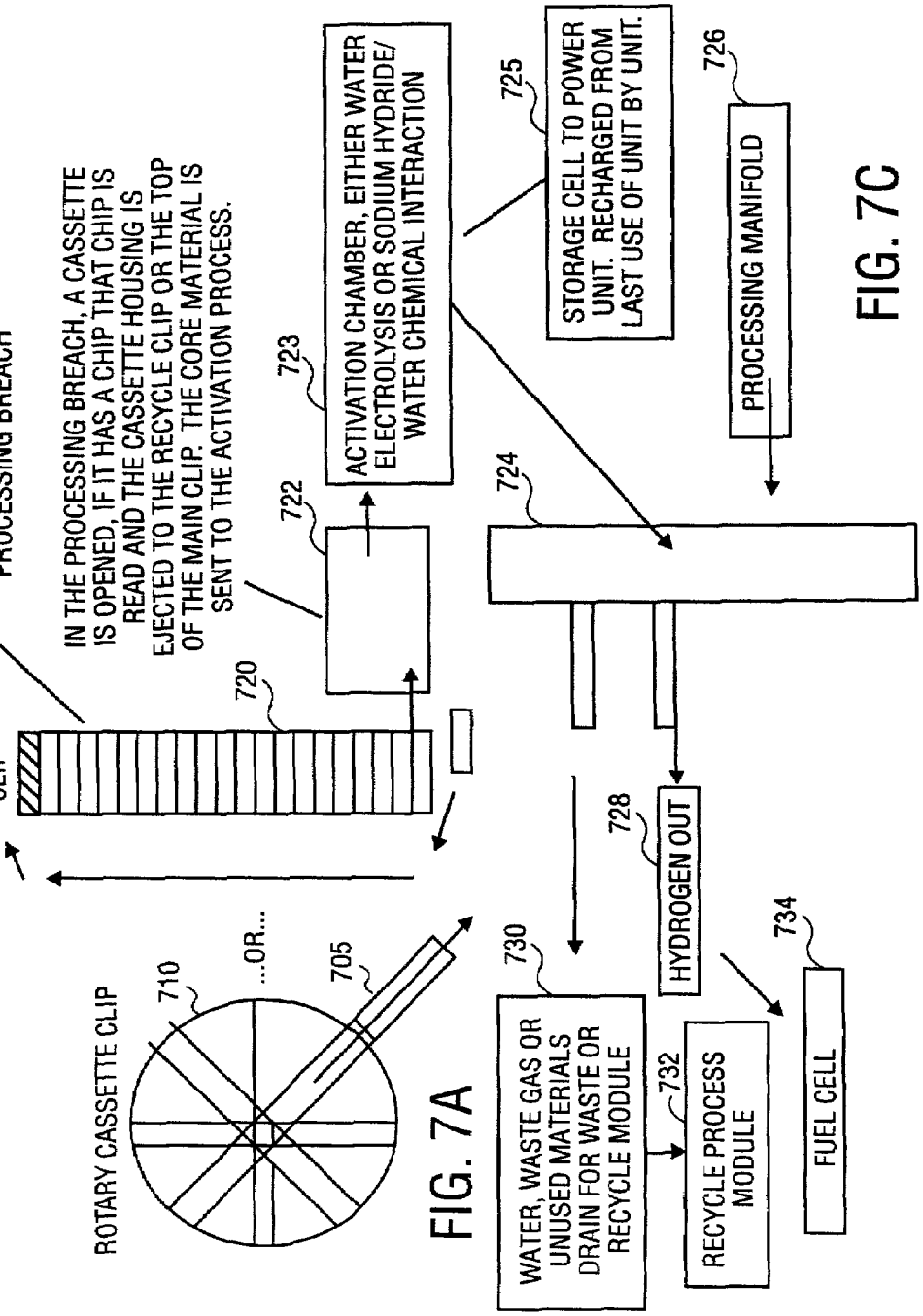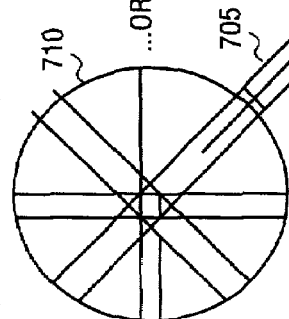

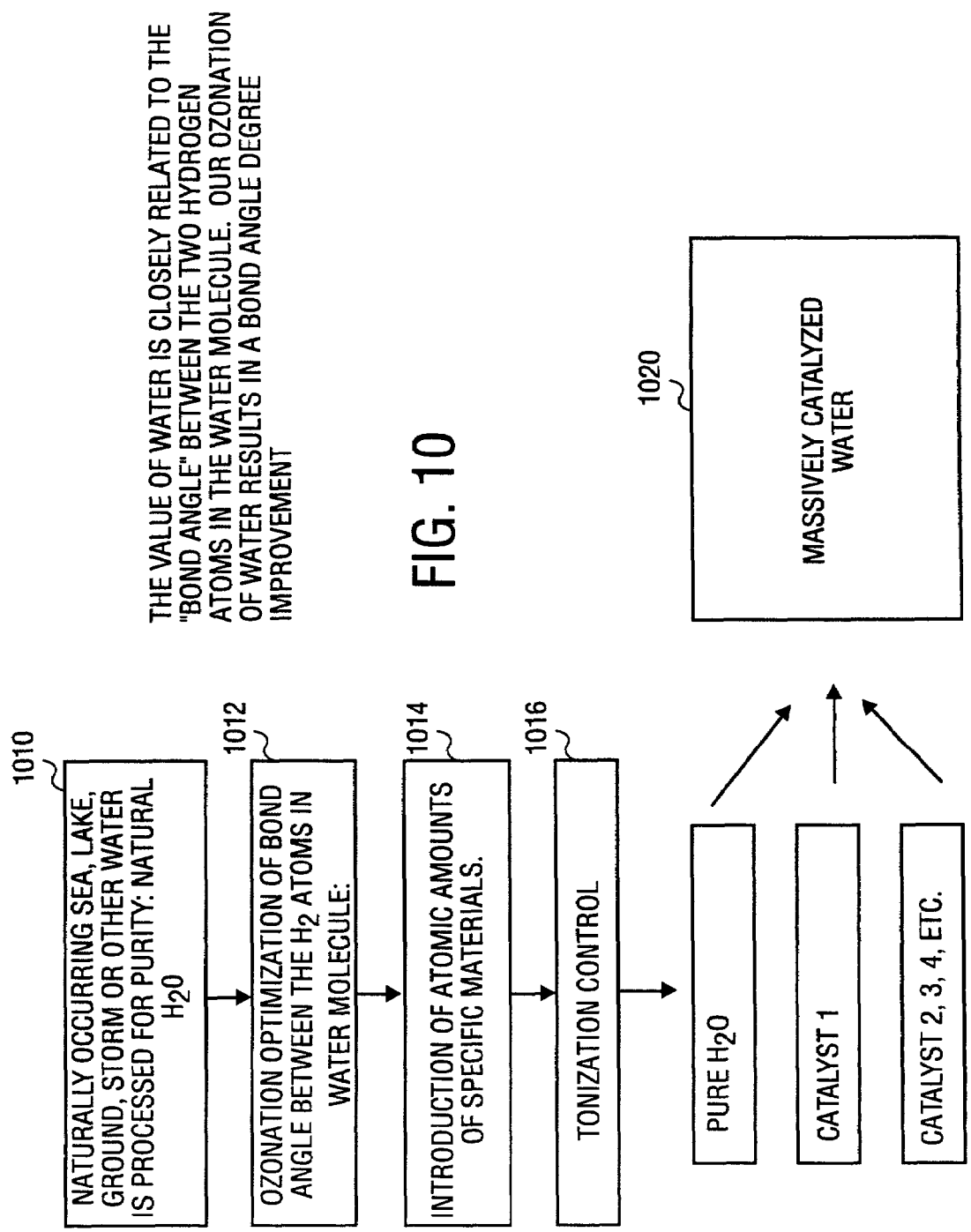

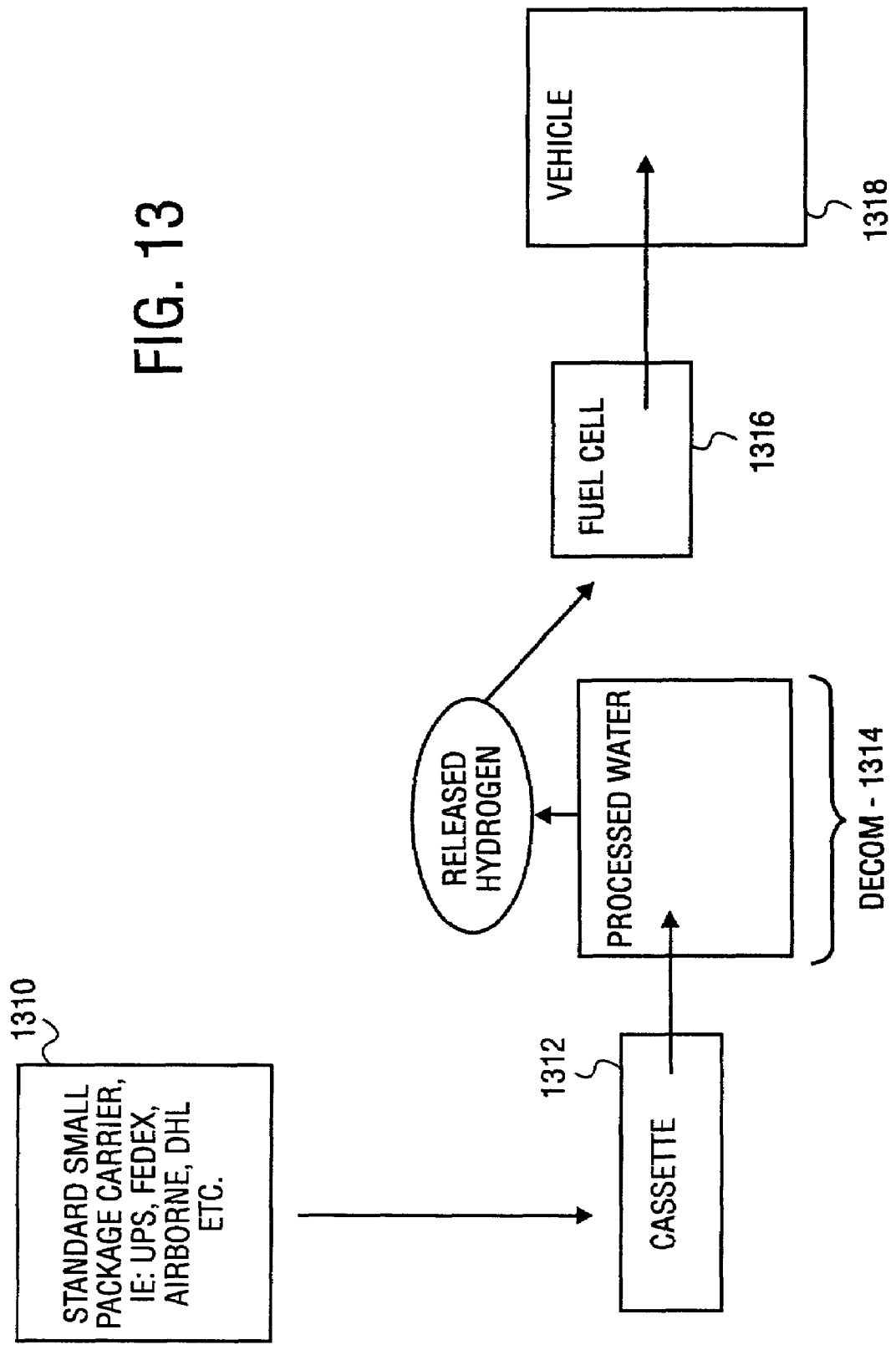

METHOD AND APPARATUS FOR A HYDROGEN FUEL CASSETTE DISTRIBUTION AND RECOVERY SYSTEM

FIELD OF INVENTION

The present invention relates to methods and means for distributing hydrogen fuel in a cassette form and recovering the hydrogen into useable fuel. The present invention also includes an information network in which user provided information related to fuel usage, tracking, and needs is communicated over a data network.

BACKGROUND OF INVENTION

It can be appreciated that alternative fuel systems have been in use for years, but certain problems have prevented mass adoption of such systems. Typically, alternative fuel system are comprised of combustion-based engines requiring petroleum-based fuel, large pressurized gas tanks or liquid gas tanks requiring certain, specific, expensive, bulky and dangerous types of transportation and distribution infrastructure.

The main problems with conventional alternative fuel systems are that they have poor energy supply duration. They are massively inefficient, particularly so with gasoline. Their older technology is now moving at such a slow pace of development that it promises to reduce its already dramatic negatives for decades to come. They require high temperatures. They require friction mechanisms in the primary engine. Some conventional alternative fuel systems use hydrogen as a fuel, but liquid or compressed hydrogen has very unsafe handling characteristics. Conventional alternative fuel systems are hard to secure. They require large 3000+ PSI (pounds per square inch) gas cylinder trucks to move through cities or across domestic interstate routes. They use caustics or liquid electrolytes. They are usable as bombs by terrorists. In the conventional alternative fuel systems which use Methanol, while less polluting to reform into hydrogen than gasoline, Methanol is very toxic. Conventional alternative fuel systems produce carbon monoxide or carbon dioxide byproducts. They are not as reliable as a battery and don't have superior specific energy, energy density, and life cycle factors. They produce harmful emissions and noise. They cause potentially planet-lethal global warming. They do not provide instantaneous startup. They cause fuel system congestion. Another problem with conventional alternative fuel systems is that current products do not exhibit portability over all systems and networks. Current products do not have enough end-user purchase location functionality, including delivery by conventional delivery services, such as Federal Express, United Parcel Service (UPS), and/or mail-order. Current products have extensive repair and maintenance needs. Current products are not simple and easy-to-use. Current products are hard to make standards compliant and interoperable. Current products produce reliance on foreign governments. Another problem with conventional alternative fuel systems are that they do not have attractive scaling economics. The current products do not expand in a more economical way than conventional batteries. Current products do not have superior distribution network efficiency and optimized raw materials utilization. Current products do not have a modular design that can be configured to suit any fuel distribution challenge. Conventional gasoline reformers are costly, bulky, energy consuming, and complex.

While these conventional systems, devices, and technologies devices may be suitable for the particular purpose to which they address, they are not suitable for compacting a large tank of hydrogen into a small unit of usable hydrogen fuel and managing, transporting, distributing and processing these materials. Recent political and global events have produced a sharply escalating demand for hydrogen supplies in extensive volumes.

Hydrogen is an abundant, clean, renewable fuel that has the potential to solve many of the world's energy and economic needs and energy-related problems. Although hydrogen is used in various applications, it has never become a major fuel source because of distribution issues associated with it. After years of development, hydrogen energy is now commercially viable in conventional fuel cell technology. However, safe and reliable, hydrogen storage and delivery is a main impediment to hydrogen becoming the world's primary fuel source.

Hydrogen is a very low-density material. Relatively small amounts require a voluminous transportation system. In the prior art, there has been no adequate solution for transporting, storing and distributing large volumes of hydrogen. Current methods generally require the storage of hydrogen in bulky and potentially explosive tanks, the freezing of deadly liquids or the consumption of polluting hydrocarbon fuels. These highly pressurized and/or volatile devices are unsafe for many applications, such as in motorized vehicles.

Hydrogen, under ordinary conditions, is a colorless, odorless, tasteless, non-toxic gas comprised of diatomic molecules. There are many industrial uses of hydrogen including manufacturing ammonia and methanol, desulfurization of petroleum products, hydrogenation of fat and oils, production of electricity, and reduction of metallic oxide ores. Hydrogen, a flammable gas that diffuses rapidly in air, has a flammable range of approximately 4 percent to 94 percent by volume (vol. %), in air, at atmospheric pressure. Spark temperatures as low as 500 degrees C. will initiate explosion of a hydrogen-air mixture. Consequently, the production and use of hydrogen is tightly controlled and regulated.

Laboratory scale, less than about 1 scfh hydrogen, systems exist which are comparatively simple and compact hydrogen fuel decompressing systems. In the commercial environment, however, strict regulations governing the production of hydrogen, in amounts exceeding about 100 scfh, for example, have increased the complexity, expense, and space requirement for these systems.

Hydrogen electrochemical systems of the prior art, including water electrolyzer systems for example, are commercially available in open metal frame structures. Systems of moderate and large capacity (greater than about 100 scfh of hydrogen) are typically integrated with separate power, control, ventilation, and heat exchange equipment when installed in a building or facility as a hydrogen fuel decompressing system. Due to the risk of an explosion of any uncontained hydrogen gas, the National Electric Code (Article 501), requires the use of explosion-proof methods when employing electrical equipment in hazardous environments. These methods include the use of explosion-proof housings, components, and certain energy limiting, "intrinsically safe", zener barrier devices, and often require housing of the fuel decompressor and associated equipment in special ventilated buildings or weatherized structures.

The hydrogen fuel decompressor systems of the prior art, which require explosion proof components and/or specialized housing, suffer from the fact that these components are more costly to procure and install, and typically require significantly higher cost and effort to deploy than their non-explosion proof commercial counterparts.

Current Hydrogen supply can be described under three conventional models.

1. Traditional Model. Produce hydrogen, store hydrogen, transport hydrogen, use hydrogen
    a. This model is expensive and dangerous. Unit costs for hydrogen increase as the hydrogen moves through the system towards use. It is also dangerous with pressurized hydrogen moving from refinery to point of use.
2. Hydrogen produced at point of use. Deliver fossil fuels to near usage site, produce hydrogen, use hydrogen at usage site.
    a. This model uses energy intensive processes to produce hydrogen from fossil fuels. This is inefficient and creates pollution.
3. Hydrogen forced onto a hydride. Produce hydrogen, attach hydrogen to metals (producing hydrides), desorb hydrogen at usage
    a. Again, hydrogen must be produced in order to adsorb it to a metal to produce the hydride. This is inefficient and currently dangerous.

What is needed in the art is a compact, reduced cost, reduced-size, self-contained, cassette-based hydrogen compression and decompression system configuration which meets the applicable codes and regulations, and can be utilized in hydrogen fuel decompressing systems and various fuel cell systems.

Thus, a readily portable unit of hydrogen fuel and a corresponding distribution and recovery method and system is needed.

SUMMARY OF INVENTION

The present invention is a cassette-based hydrogen fuel distribution and recovery method and system.

An object of the present invention is to provide a hydrogen core-state compression/decompression array and a system for compacting a large tank of hydrogen into a small unpressurized readily portable cassette and an automation unit for converting this hydrogen into usable hydrogen fuel and managing, transporting, distributing and processing these materials. Another object is to provide a hydrogen core-state compression/decompression array that provides a unique cost-effective, safe, reliable and feasible alternative fuel production, transport & distribution technology for the world's energy needs. Another object is to provide a hydrogen core-state compression/decompression array that holds large amounts of hydrogen in a relatively small cassette. Another object is to provide a hydrogen core-state compression/decompression array that after transport, at the site that the fuel is required, turns the contents of the relatively small cassette back into usable alternative fuel. Another object is to provide a hydrogen core-state compression/decompression array that includes a software application to allow the distributors and the end-users to track, manage, order, pre-order, bill, allocate and provide other operation functions, in real-time, for the transport, distribution, supply, delivery and use of the alternative fuel in an integrated manner. Another object is to provide a hydrogen core-state compression/decompression array that uses hydride metals to densely pack hydrogen into a very small cassette as one of many possible cassette core materials via a process of enhanced catalyzation and layering of metallic hydride compounds at an atomic level. Another object is to provide a hydrogen core-state compression/decompression array that massively catalyzes water to make it function as a feasible medium for hydrogen fuel transport as one of the many possible cassette core materials via a process of Massively Catalyzed Water. Another object is to provide a hydrogen core-state compression/decompression array that can be affixed to a vehicle to turn the cassettes into usable hydrogen fuel on-board the vehicle. Another object is to provide a hydrogen core-state distribution system which is a load-responsive, hydrogen-on-demand solution. Another object is to provide a hydrogen core-state distribution system which uses no high heat, no liquid hydrogen and no high-pressure transport units. Another object is to provide a hydrogen core-state distribution system which may include fuel cells and self-contained full-circle energy production and reproduction. Another object is to provide a hydrogen core-state distribution system which can be small enough to be worn on a belt or large enough to power a vehicle or something larger. Another object is to provide a hydrogen core-state distribution system which eliminates the possibility of explosion from reactive or pressure causes. Another object is to provide a hydrogen core-state distribution system which can be adapted easily to interface to all known fuel cell and hydrogen input needs. Another object is to provide a hydrogen core-state distribution system which may not require external power. Another object is to provide a hydrogen core-state distribution system which may provide reversible storage of hydrogen. Another object is to provide a hydrogen core-state distribution system which allows any consumer or business end-user to order fuel for direct delivery via a web-page or an 800 number. Another object is to provide a hydrogen core-state distribution system which will automatically re-supply all end users when they need more fuel. Another object is to provide a hydrogen core-state distribution system which Federal Aviation Administration (FAA) and National Transportation Safety Board (NTSB) certifiable and can be delivered by US Mail or purchased at your local Supermarket.

Other objects and advantages of the present invention will become apparent to the reader and it is intended that these objects and advantages are within the scope of the present invention.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 5A-5F illustrate various types of Hfuel cassettes.

FIGS. 7A-7D illustrate systems using fuel cassette clips.

FIG. 10 is a process for creating a Massively Catalyzed Water compound.

FIGS. 13, 14, 15A-15B illustrate various embodiments for use in vehicles or other mobile platforms.

DETAILED DESCRIPTION OF THE PREFERRED EMBODIMENT(S)

Figure 1:
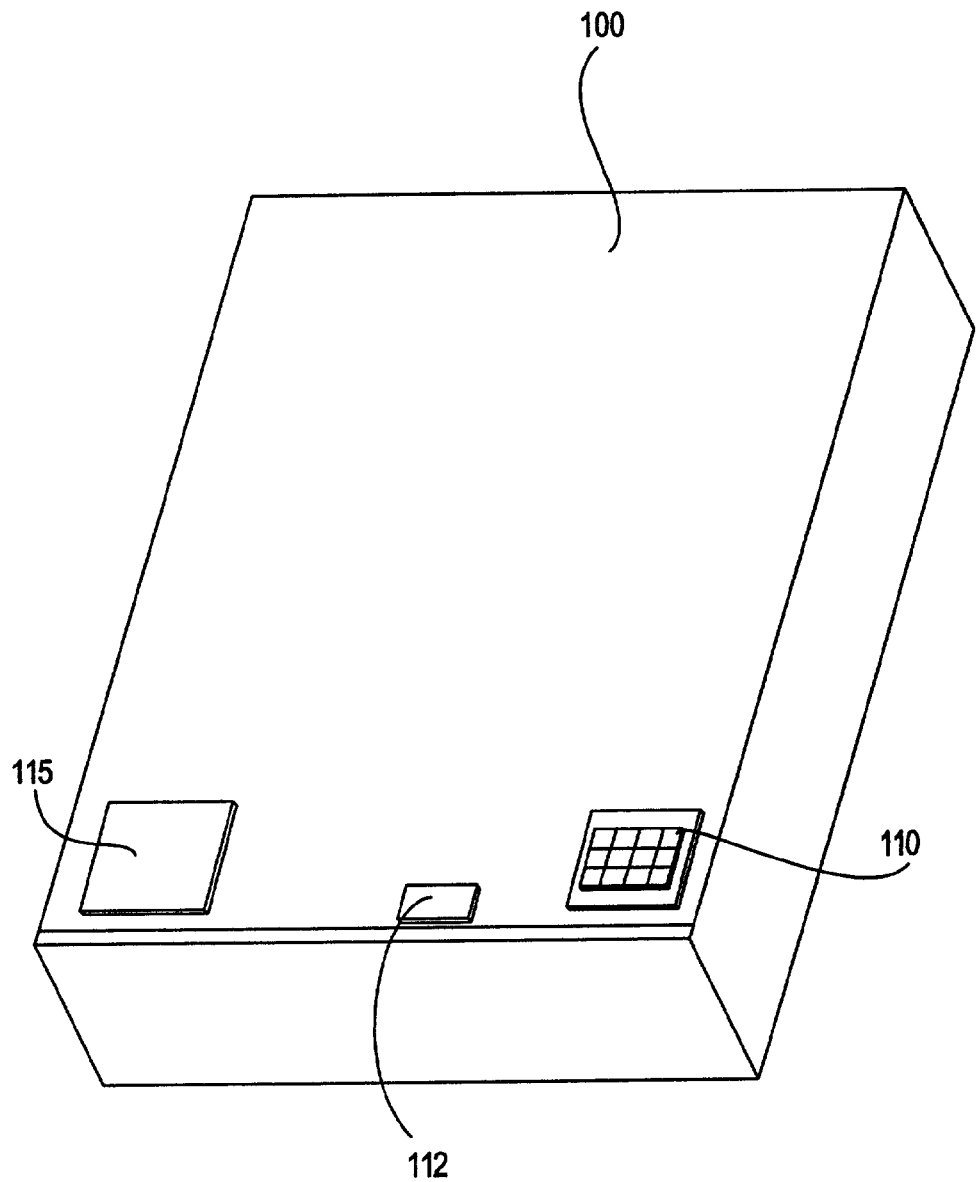
FIG. 1 is a figure of an Hfuel (hydrogen-rich core fuel material) cassette.

A cassette-based hydrogen fuel distribution and recovery method and system is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, compounds, circuits, processes and interfaces have not been shown or described in detail in order not to unnecessarily obscure the present invention.

As will be described in detail in the following sections, the present invention includes embodiments using "Smart-compression" technology and global common carrier delivery of hydrogen direct to industry and consumers. These embodiments further include a unique, cost-effective, safe, reliable and feasible alternative fuel compression, transport and distribution technology. These embodiments further provide the transport, storage and distribution systems for hydrogen to charge fuel cells.

The present invention includes a novel fuel cassette technology which stores and safely transports hydrogen as a solid, liquid, slurry, or other form enabling the release of hydrogen directly into a conventional fuel cell on demand. There is no need for dangerous and expensive hydrogen distribution and delivery as is currently required.

As will be described in more detail below, the present invention stores the hydrogen in safe-to-transport readily portable un-pressurized cassettes. The energy potential of hydrogen is carried in the chemical bonds of the invented fuel cassettes core material, which, in the presence of a catalyst inside the invented decompression unit (Decom unit), releases hydrogen and produces electricity. The primary input components of the reaction are water or warm air and the invented fuel cassettes core material, the base form of which is found globally in substantial natural reserves. The structure and operation of the fuel cassettes and Decom unit of the present invention will be described in more detail below.

The system and methods of the present invention allow for the delivery of hydrogen (stored in Fuel Cassettes) via the traditional UPS, Postal or FedEx delivery systems. This ease of delivery revolutionizes the energy distribution and transport industries. The fuel cassettes of the present invention can be approved by the Department of Transportation, FAA, and NTSB as non-hazardous material and can be shipped anywhere at anytime.

As will be described in more detail below, the present invention has several advantages over conventional hydrogen fuel technology. The following list details several of the advantages.

1. Because the present invention holds hydrogen chemically during delivery and distributes hydrogen only when needed, storage and delivery is drastically safer than current solutions. This solves the storage and delivery problems of conventional systems.
2. Without costly production, storage, delivery costs, and operation costs, the present invention can deliver Hydrogen at many times lower costs than current market prices.
3. The hydrogen distributed by the present invention is 99.99% pure. Most hydrogen today comes from fossil fuel reformers that produce hydrogen from methane, gasoline, natural gas, or other fossil fuels. This conventional hydrogen is wasteful to produce and contains carbon monoxide that can poison some types of fuel cells if not removed.
4. The system and method of the present invention is infinitely scalable.
5. Business infrastructure in the present invention is from the point of presence.
6. Smart technology and fuel management software improve the efficient distribution system of the present invention.
7. Single use power cells that use the invented system to provide energy for the portable power markets, include laptop computers, cellular telephones, hearing aids, personal organizers and other portable devices.
8. The present invention can be used to sell hydrogen for use in traditional internal combustion engine devices. (Testing indicates 3× improvement in efficiency over gasoline)
9. Mass distribution through fleet refueling centers can be realized through the existing network of neighborhood gasoline stations and via UPS, Federal Express, US Postal mail and the neighborhood supermarket.
10. The fuel cassette core material of the present invention can be recycled.
11. In addition to safety and environmental advantages, the present invention has operating and manufacturing efficiencies superior to those of conventional technologies. In internal combustion engines, well-to-wheel efficiency is a common measure of how much energy is lost in the process of producing, refining, formulating and consuming a fuel. Our testing to date indicates that an internal combustion engine consuming hydrogen distributed from our fuel cassettes core material will provide a vehicle with significantly higher well-to-wheel efficiency than that of gasoline, while reducing greenhouse gas emissions. The system of the present invention, when used as a hydrogen source to power a fuel cell, is up to three times as efficient as gasoline.

A conventional fuel cell is a device that combines hydrogen, derived from a fuel such as natural gas, propane, methanol, gasoline, or other hydrogen fuel source, and oxygen from the air, to produce electric power without combustion. Conventional fuel cells are comprised of a thin, flat, multi-layered "sandwich". The 'sandwich' consists of two electrodes, an 'anode' and a 'cathode'. These two electrodes are typically separated by a plastic sheet (called a 'membrane'—the Membrane Electrode Assembly (MEA)). In simple terms, hydrogen enters the fuel cell, goes through the sandwich, hits an electric charge, exits the membrane into oxygen, becomes usable energy and creates its residue, basic water. A housing may contain many fuel cells (referred to as a "stack"), the hydrogen fuel (a bottle of varied sizes), and the unit's controls. The purpose of the controls is to start, stop and monitor the electricity produced by the collection of fuel cells (i.e. the stack).

In the small-scale commercial market, where sizes of fuel cells range from 25 watts to 250 kilowatts, the conventional fuel cell has been the type most tested and used in laboratories and in prototypes. The smaller size and lower temperature characteristics make conventional fuel cells ideal for use in vehicles, and therefore, much of the current testing to date in transportation markets has involved this type of fuel cell.

The conventional fuel cell requires hydrogen. Current methods of storing significant amounts of hydrogen in vehicles require use of large tanks of liquid (cryogenic) or compressed gaseous hydrogen. For a 3,000-pound automobile to achieve a range of 300 miles using a conventional fuel cell system, the equivalent of 32 twenty-five pound tanks (weighing 800 lbs.) of compressed gaseous hydrogen would be required. For cryogenically stored hydrogen, the weight drops significantly. However, though the weight of the overall system decreases, the overall energy efficiency does too. Approximately two-thirds of the total energy of the cryogenically stored hydrogen is required to liquefy the hydrogen. Both of these conventional systems are cumbersome, voluminous and potentially hazardous An accident that damages a full tank of either liquid or gaseous hydrogen might result in an extremely powerful explosion. To date, we are unaware of better methods for storing significant amounts of hydrogen in a compact, lightweight and safe manner, which is National Transportation Safety Board, US Postal Service, Federal Aviation Administration and Department of Transportation safety approvable.

Hfuel Cassettes of One Embodiment

According to one embodiment of the present invention as shown in FIG. 1, a compressed fuel cassette or module is shown. This cassette may be denoted herein as the cassette, module, hydrogen fuel cassette, or Hfuel cassette. In one embodiment, the cassette comprises a rigid outer casing defining one or more interior regions, which may be used to carry a core fuel, being solid, liquid, slurry, a hybrid or other form of hydrogen producing material. Another interior region of the cassette may be used for storage of exhaust/waste materials produced by the processes of the present invention. Alternatively, exhaust/waste materials may be stored in the same region previously used for storage of the core fuel material, once the core fuel material has been removed.

The Hfuel cassettes of the present invention are compound-agnostic. This means the core fuel in the cassette's interior region(s) may be any of a variety of hydrogen producing compounds. In one embodiment, the cassette includes a conventional electronic device 110 attached to the cassette, which can be used to store and process various items of information related to the cassette. This cassette information will be described in more detail below. In one embodiment, the cassette may also include a separate cassette type index or bar code 112, which defines the type characteristics of the cassette including the type of hydrogen compound the cassette carries. In other embodiments, the cassette type index is included with the cassette information stored on electronic device 110. The cassette may also include a memory and telemetry device 115 used to communicate cassette information back to a control software system. This control system is described in more detail below. Alternatively, the functionality of the device 115 may be incorporated into electronic device 110.

Figure 3:
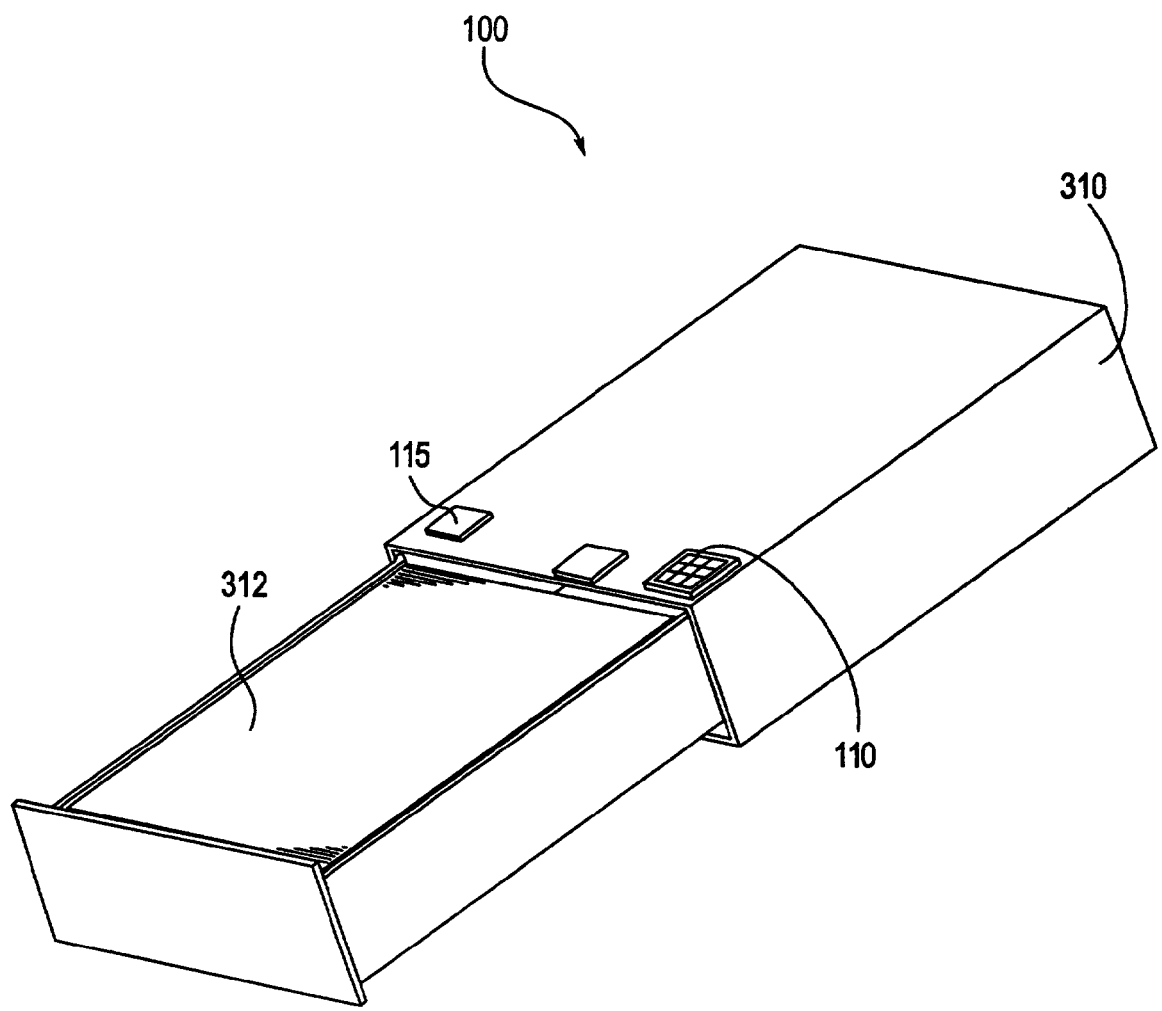
FIGS. 3 and 4 illustrate embodiments of the Hfuel cassette.
Figure 4:
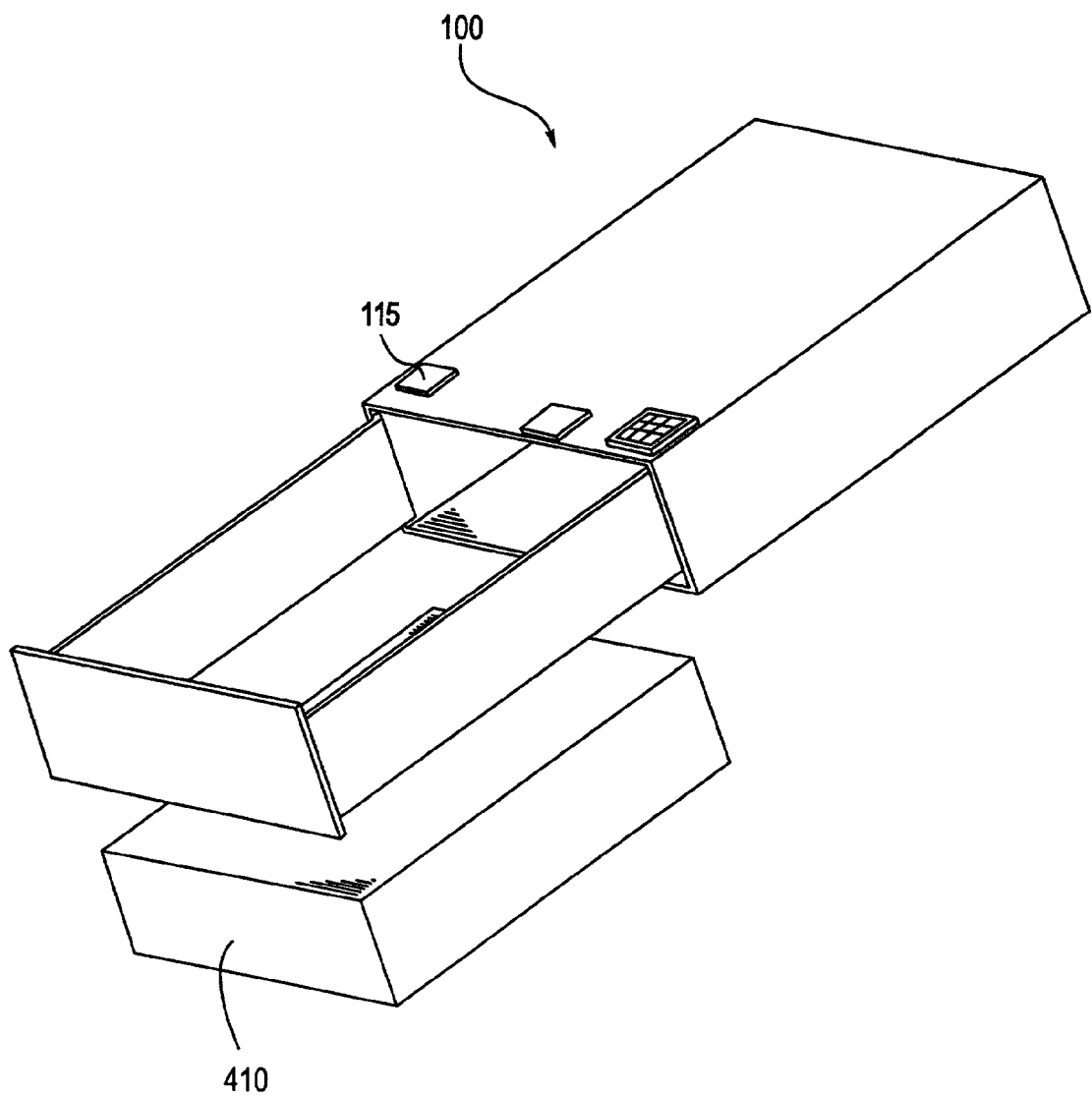

The Hfuel cassette is configured to fit into a cassette-receiving receptacle 215 of a Decom unit 210. See FIG. 2. The Decom unit 210 recovers or decompresses the hydrogen core material compound from the cassette 220 and processes the compound into usable hydrogen fuel. In one embodiment, the cassette-receiving receptacle 215 or the cassette 220 itself includes a mounting frame into which a cassette may be inserted. See FIG. 2. In another embodiment, shown in FIGS. 3 and 4, the cassette 100 includes an outer shell 310 and an internal tray 312, which holds a package 410 containing the hydrogen fuel compound. In this configuration, the cassette is inserted into the receiving receptacle 215 of the Decom unit. The Decom unit slides open the tray 312 and the package 410 drops out of the cassette for processing by the Decom unit. After the fuel compound in the package is used by the Decom, the package 410 is automatically lifted back into tray 312. The tray 312 is then returned into outer shell 310 and the cassette 100 may be removed from the Decom unit.

Figure 2:
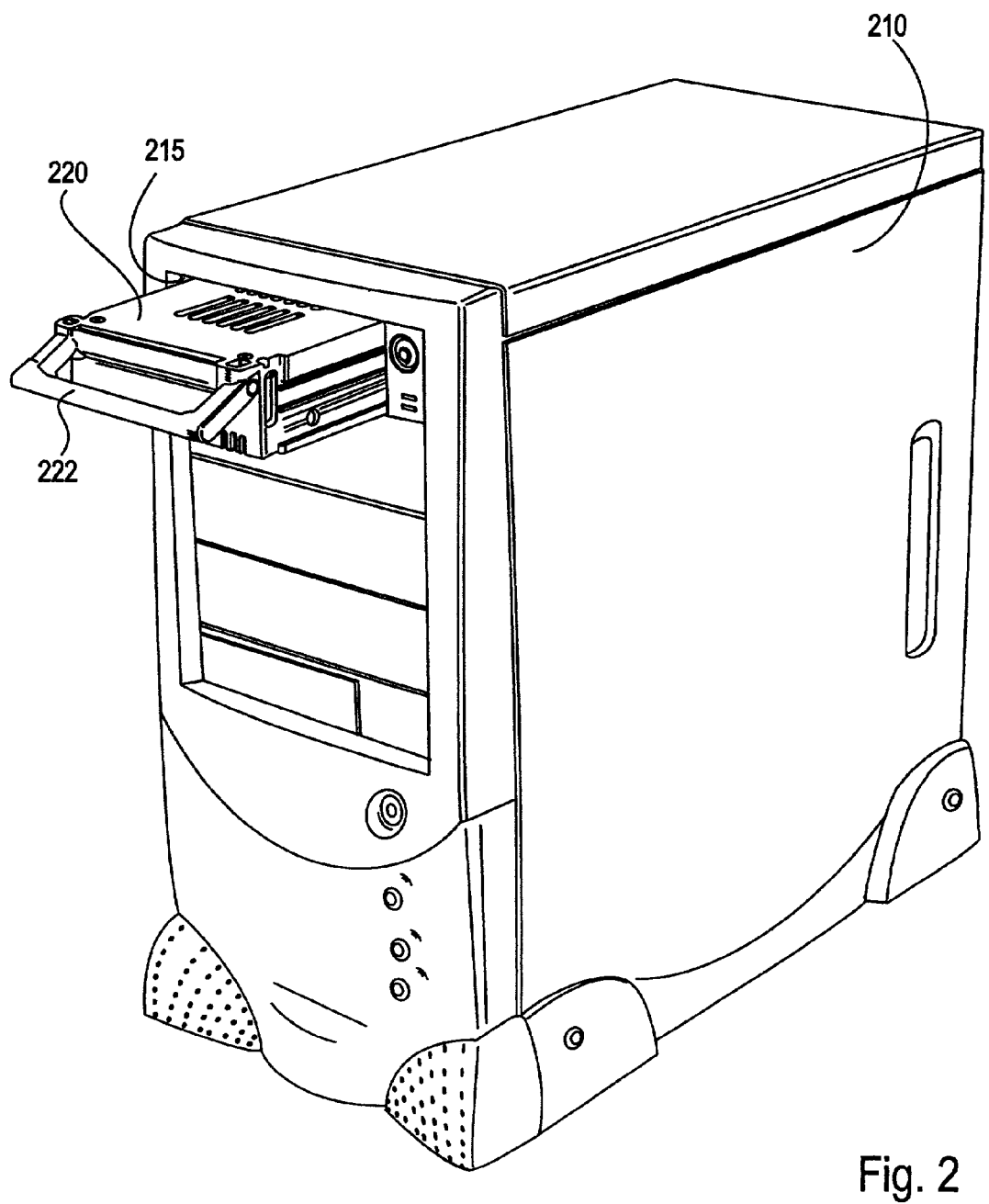
FIG. 2 is a figure of a Decom (hydrogen decompression and recovery) unit.

In yet another embodiment, the cassette casing has a pivoted handle 222 at the front side, which separates the casing from the mounting frame or receiving receptacle for loading or unloading the core fuel in the cassette (see FIG. 2). It will be apparent to those of ordinary skill in the art that many other equivalent cassette embodiments are possible.

In several embodiments of the present invention, there are at least five different types of cassettes. The outside of the cassette is generally the same for each type of cassette. The interior and the core material are different for each. The chip 110 and bar code 112 on each cassette tells the Decom unit which kind of cassette they are. The cassette receiving modules of the Decom are changed depending on which kind of cassettes one will be using. The primary materials from which cassettes are made include aluminum, plastic, and ceramic. Each cassette is configured to hold approximately 28 KW of releasable Hydrogen energy in various forms of core material.

Cassette types:
1. MCW (Massively Catalyzed Water) and Sodium Hydride or other water reactant. The MCW Liquid is specially compounded water for the core material of an Hfuel Cassette.
2. A mud-like slurry, which can flow through tubing inside the decom and contains water reactant.
3. Solid alloy. The Alloy material is specially compounded Metal Hydride alloy for the core material of an Hfuel Cassette. As used herein, a metal hydride or other art recognized hydrogen storing alloy may sometimes be referred to herein as simply an "alloy".
4. Pre-sliced alloy
5. Powdered, charged, hydride MCW Water Massively Catalyzed Water can be created using the electromechanical process as follows (See also FIG. 10):
1. Ozonize the water: The value of water is closely related to the "bond angle" between the two hydrogen atoms in the water molecule. Our Ozonation of water will result in a bond angle degree improvement.
2. Purify the water.
3. Introduce Atomic level amounts of specific materials to reduce the kinetics involved in the reaction.
4. Ionize the water.
5. Add extensive layers of catalysts to the water to achieve the best hydrogen release reaction for safest, lowest kinetic input, highest hydrogen output results. This will produce an acceptable MCW compound.

In other embodiments, other compounds (core materials) may be used in an Hfuel cassette. These other compounds include:
Low temperature metal hydrides
Alanete Hydrides
Carbon Nanotubes
Carbon Fullerenes
Glass Microspheres
Water reactive slurries
Water Reactive catalysts Decom Unit of One Embodiment The Decom unit 210 recovers or decompresses hydrogen core fuel material and produces useable hydrogen fuel for insertion into or charging a removable conventional fuel cell or for direct hydrogen fuel output to a fuel-consuming device.

In one embodiment, the Decom unit includes its own fuel cell with a trickle charge battery that is fed from a limited percentage of the fuel cell so the Decom unit is self-powered in this configuration. Thus, embodiments of the Decom unit do not need external power. Other embodiments include a solar cell internal power source option.

Other embodiments of the Decom provide various configurations for receiving cassettes. In some embodiments, the cassette receiving portion of the Decom can be modularized for swap out and easy reconfiguration. The configurable Decom can receive fuel cassettes in several different optional ways. These configurations include:
 Single fuel cassette
 12 pack fuel cassettes
 6 pack fuel cassettes
 Radial 12 pack mount feeder
 Linear 6 pack mount feeder In several embodiments of the Decom unit of the present invention, the Decom supplies High purity (99.999+%) dry gaseous hydrogen output at production rates: 0.5-1 normal cubic meters per hour (Nm3/h) (19 to 38 scf/h) process pressure 10-250 PSIG for consumption at 15 to 20 SLPM at rated net output. The Decom in one embodiment is characterized as follows:
 Features: No liquid hydrogen required, no pressurized hydrogen required, minimizes hydrogen inventory, no caustic electrolytes, no environmental impact, lower cost than competing solutions, asbestos free, reliable, compact, automatic control, no EMF, no external power required, easy to use, portable, weatherized casing option, vehicle-mountable.
 Waste Emissions:
 Liquid water: Maximum 0.87 liters (30 fluid oz.) per hour
 Noise: 20 dBA @ 1 meter
 Integration/connection: Fuel interface 45° flared tube fitting for ¼' OD tubing-metallic
 Electrical interface: #8 AWG electrical wire
 Control interface: Full duplex RS 485
 Input: Water, as option
 Output:
 port1: Hydrogen
 port2: Venting for overpressure:
 port3: Modem
 Communications: Memtel™ via CDPD wireless and/or modem
 Communications connection:
 One PCMCIA slot for Memtel wireless
 One RJ-11 phone jack and modem
 Input power: None
 Functional Switches:
 on/off, Eject, Test Cycle, Menu, >, <, Sleep
 Indicator: Monochromatic LCD readout It will be apparent to one of ordinary skill in the art that a particular Decom unit could be configured in various ways.

The Decom system is load responsive in that it produces hydrogen based upon demand by the fuel cell or Mem-Tel monitors on the energy-using device, engine or electronic appliances. The Decom unit contains a sub-module for containing pressurized hydrogen gas. There is a hydrogen relief valve and monitor system in all sections of the Decom system with containers which house hydrogen in a gaseous state. The alloy core material, in one configuration, uses extensively catalyzed hydride alloy compound. The MCW cassette or cassette section provides for liquid water-based compound storage. The Decom unit provides a system to move the alloy compound into contact with the water compound in a controlled manner so that hydrogen gas is desorbed or produced via the reaction. The Decom unit provides a means to move the gaseous state hydrogen to the fuel cell input port. The Decom unit has an optional thermal module to produce heat, which enhances the process of producing gas state hydrogen from the combination of compounds. The alloy core material in an alloy cassette or cassette section provides for the use of either calcium hydride, lithiumborohydride, sodium hydride, Sodium, Lithium, Potassium, Calcium, Calcium Hydride, Sodium Hydride, Lithium Hydride, fullerene hydride, sodium aluminum hydride, lithium hydride, lithium aluminum hydride, Magnesium hydride, Sodium Magnesium hydride, general metal hydride or similar compounds or alloys combined with an atomic level optimization using the P-C-P pincer complex. To produce the alloy base material, the pre-processing array of the Decom unit provides, as one option, a method for extracting sodium alloy from Methane and sodium hydroxide without high heat deployment but rather extensive chemical reaction via catalysts. The Decom/cassette system also provides for the use of a chemical hydride slurry for the hydrogen carrier and storage medium. The slurry protects the hydride from contact with moisture and makes the hydride transportable over tubing, pipes and conduits. Upon reaching the location proximate to where the hydrogen will be used (use-nexus), a chemical hydride/water reaction is caused by the Decom unit to produce high purity hydrogen. The spent hydride is recovered by the system for reuse. Some versions of the cassettes have fuel cells within them and thus have a positive and negative power out connect on them. All Decom units have a power out, but the power in is always an optional module as the Decoms can be self-powered. The smallest system in one embodiment is a combined Decom and cassette holder with mini-fuel cell that can be worn on the belt and has a common DC adapter to power cell phones, pocket pc's, etc. This ultra small unit can be self-powered via piezo-electro energy pressure transducer worn in the heel section of the shoe or a kinetic energy device worn on the belt, which uses the motion of the body to charge a storage cell. A hydrogen generation system comprising an intelligent cassette containing base materials in either separate or combined cassettes, a water immersion container for receiving the contents of the cassette, an electronic circuit and or bar code and or data input/output (I/O) unit for reading the health, status, location, ID and volume of material of the cassette, including a cassette receiving aperture and a rotational or linear clip for multiple cassettes. An Infrared reader on the Decom unit, which is readable by the infrared (IR) device on IPAQ, Palm and similar handheld computers to allow the user to be their own "gas reader", and to interface with software on those devices for planning, management, billing and interaction with the network software. The use of carbon nanotube and doped carbon nanotube manifestation and development density increase and formation process in the alloy cassette production process in order to improve the effectiveness of the alloy base material. In a configuration using a solid alloy type cassette, the process of pre-slicing the rectangular blocks of alloy material inside the alloy cassettes or combination alloy/water cassettes and individually scraping those slices so as to allow a controlled released of the alloy into the water in a slice-by-slice method. Alternatively, the solid base material is ejected from the cassette into a processing module of the Decom unit, the Decom unit slicing system allowing a controlled released of the alloy to the water in a slice-by-slice method. The Decom unit stores the alloy in the system out of immediate or accidental contact with water, which could cause a pressure explosion if alloy material were sitting in water without being processed, and controls the contact with water via the electromechanics of the Decom unit.

In the case of coatings on alloys stored in water or activating liquid, the coatings could degrade or, their could be a manufacturing error, which does occur in high volume production. If stored in water, the water could become contaminated and the coatings could suddenly degrade and cause a chain-reaction pressure and fire explosion. The Decom unit provides at least 3 levels of control and separation from the activating liquids in cassette versions, which use an alloy/water reaction process. The modularized Decom unit can be adapted easily to interface to all known fuel cell and hydrogen input needs. In the present invention, the alloy base material can be produced from many different alkali and alkaline earth metals and their related hydrides. The alloy base material can also use rare earth hydrides, which are different from alkali and alkaline earth metals and their related hydrides. Rare earth materials release hydrogen when they are heated. The Decom unit can deploy a thermal reaction chamber in the case of the rare earth hydrides. The recycle module in a Decom unit processes waste sodium hydroxide (NaOH) into sodium hydride (NaH) or similar recycling within the Decom system. The recycle module forms the waste NaOH, or other waste material, into a rectangular block, wraps the block, and insets that block into an empty cassette, a cassette which had just housed base material hydride, or similar material, for sale to an NaOH user, of which there are massive volumes in the world. The same cassettes can then be used to either remake base material or to be sold to a recycle center or sold directly to the paper, cosmetic, plastic and other industries who badly need NaOH. This makes the use of energy not only efficient and environmentally safe but also creates a revenue stream for the energy user. The core material alloy does not need to be a solid block of metal. It can be a chemical slurry or a powder. A cassette can be thermoformed from thin vinyl or acrylic. The information electronics, the identifier code, or Mem-Tel device could be applied to the cassette via adhesive and it could be sealed with a metalized paper or plastic covering over its aperture via an adhesive substrate. The user could pull off the adhesive sealant and push the cassette into the Decom aperture. Flanges in the thermoformed plastic line up the cassette to the Decom input aperture mouth and an extraction arm pulls the core material inside into a receiving breach. The solid alloy type cassette has a rigid plastic cassette mouth but a flexible metalized fabric, Mylar, plastic/foil or similar robust yet lightweight thin skin or sheath housing. The user peels off a covering at the mouth, puts the mouth of the cassette against the aperture and pushes the other end of the cassette, causing the flexible outside covering to collapse accordion-like and drive the rigid internal material into the aperture. See FIGS. 11A and 11B. The cassette and the Decom unit are "hydride-agnostic", meaning that hydrides have an infinite variety of compound varieties. The system of the present invention provides reversible storage of hydrogen. Hydrides are doped in the preparation process with foreign metal compounds as one part of the hydride acceleration process. The belt mounted advanced Decom unit contains a battery for power storage, a fuel cell and a waste recycling module in highly miniature form. See FIGS. 16A-16C. The cassette supplies the water/hydride mix and can recycle internally for small loads or be removed at night and placed into a recycling-only version of the Decom unit to be fully charged for the next use period. In a solid alloy type cassette, the solid material in the cassette is pushed out, under Decom control on demand, by a conventional rotary-to-linear leadscrew drive pusher, as one possible option.

Turning now descriptively to the drawings, in which similar reference identifiers denote similar elements throughout the several views, the attached figures illustrate a hydrogen core-state distribution/recovery, compression/decompression array, which includes an Hfuel Alloy Cassette, Hfuel MCW (Massively Catalyzed Water) Cassette, Decom unit, Decom Home Unit, Memory Card, Hydrogen network distribution and central control software (H-Net), Processor Array, and Vehicle Decom unit. The Hfuel Alloy cassette is a relatively small container holding a specially compounded and chemically accelerated metal hydride alloy as a core material in a manner ready to be deployed by a Decom unit to extract the usable fuel. The Hfuel MCW cassette is a relatively small container holding specially compounded water as a core material in a manner ready to be deployed by a Decom unit to extract the usable fuel. We use a catalytic-process improvement for complex water compounds, which are used in our MCW cassettes. The Decom Unit is the automated fuel extraction device, into which the Hfuel Cassettes are inserted. The Decom Home Unit is a very efficient, minimum-sized unit designed to connect at a user's home or office to their fuel cell fuel input or to have a fuel cell incorporated into it so that this version of the Decom can help the user to remove themselves from the local or regional power grid and supply and manage their own energy needs. The Memory and Telemetry device is an electronic circuit housed in a small package. It enables the Decom to read the current fuel usage and communicate that information back to the H-Net software database to help the distributor and the user to determine what the best delivery, distribution and management configuration is for their onsite energy system. The H-Net Software is a global database software package, which interacts with the distributors, management staff, the end user and the telemetry devices for integrated management, operations, ordering and scheduling of fuel. The Processing Array is the factory system designed to produce Hfuel Cassettes. The Vehicle Decom unit is a smaller device, which processes Hfuel Cassettes on board a vehicle and supplies the fuel directly to the vehicle fuel cell or engine system. It will be apparent to one of ordinary skill in the art that there are many possible structural and functional variations of the Hfuel cassette, the Decom unit, the Decom home unit, the Memory and Telemetry card, the H-Net software, the Processing array, and the vehicle decom unit. All such variations are within the scope of the invention disclosed and claimed herein.

The fuel cassette can hold either MCW liquid material or metallic alloy material but it does not need or require both materials. An Hfuel Cassette has very high gravimetric Hydrogen, or similar alternative fuel, density. It is produced at a low cost. It has very productive hydrogen, or similar alternative fuel, dissociation energetics. The weight percentage of usable fuel discharged from an Hfuel cassette is highly favorable from a thermodynamic standpoint at standard temperatures with very high kinetics and very feasible reversibility. The Alloy Cassettes can perform dehydriding and rehydriding effectively. Hfuel uses levels of catalysts to increase its effectiveness. There are many possible structural and functional variations to the Hfuel Cassette. In one such embodiment, the cassette has a metal or plastic housing. The housing is a preformed separate material or the internal core of the housing could be dipped into a plastic or metal compound, which would seal the core material within. The housing has an electronic circuit embedded in it, which assists the Decom unit in its process or which assists the Memory Telemetry device in its process. The cassette may have rails, ridges, guides, depressions, recesses or ridges, which assist the Decom unit or the Processing array in organizing and handling the cassette. The cassette could have a housing in multiple parts, a doorway or an ability to be opened or broken by the Decom unit to expose the internal core material. In this version of the cassette, there is a metallic alloy, which is used as the core material of the cassette.

The Hfuel Alloy Cassette, or the Hfuel MCW (Massively Catalyzed Water) Cassette, Decom unit, Decom Home unit, Memory Card, H-Net Software, Processor Array, and Vehicle Decom unit, may all be interconnected parts of a unitized system of one embodiment. The system does not need to be unitized to work but functions best when unitized. The interconnections are the following: The Hfuel Cassette is produced from the Processor Array system. HFuel Cassettes can have a core material component composed of specially compounded water, specially compounded hydride chemicals or other matter as described above. The Hfuel Cassettes are loaded in any of a number of different sized Decom units that automatically process the core material in the cassettes to extract the usable hydrogen and provide it to a conventional fuel cell for use in an engine or device. A Decom unit or any unit that uses fuel can have a Memory card attached to it to monitor and advise, via telemetry, the status of the end-user fuel system. The H-Net Software receives data from the Memory Card and processes it via a database that helps end-users and distributors to manage and plan their fuel needs and operations. The Vehicle Decom is a miniaturized Cassette holder and processing unit with an integrated Memory Card, which locates the nearest hydrogen fuel source.

With respect to the above description then, it is to be realized that the optimum dimensional relationships for the parts of the invention, to include variations in size, materials, shape, form, function and manner of operation, assembly and use, are deemed readily apparent to one of ordinary skill in the art, and all equivalent relationships to those illustrated in the drawings and described in the specification are intended to be encompassed by the present invention.

Figure 5B:
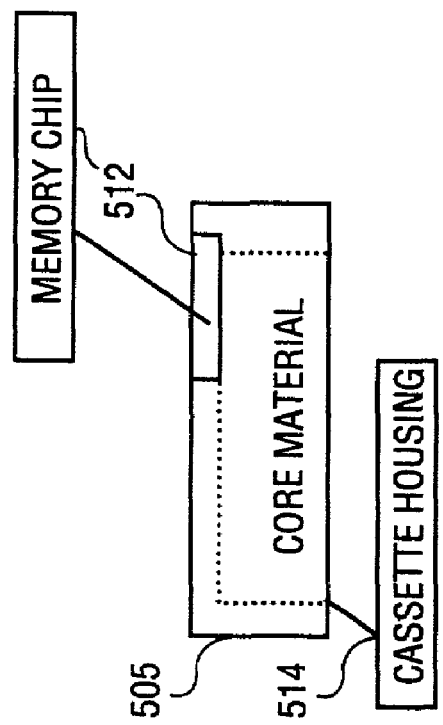
Figure 5A:
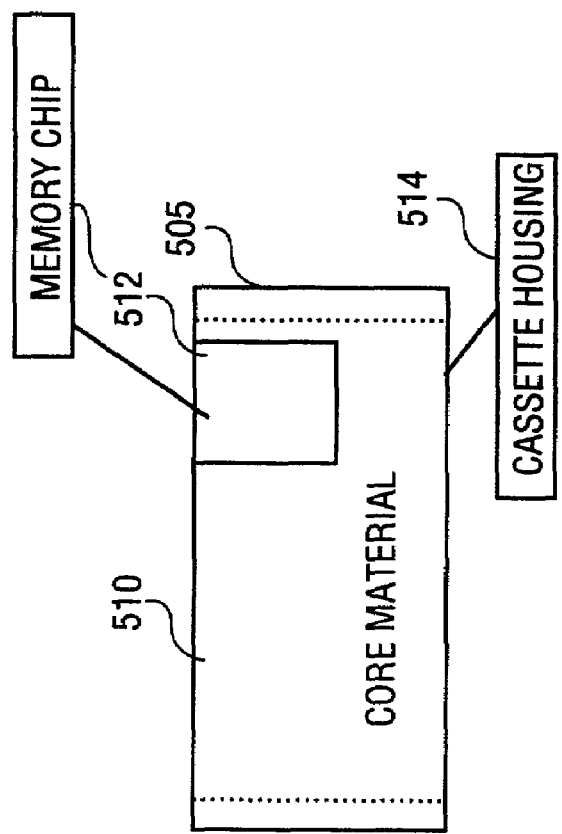

Referring now to FIGS. 5A-5F, various embodiments of the fuel cassette of the present invention are illustrated. Referring to FIG. 5A, a fuel cassette 505 is shown to include a region for the core material 510 from which the Hydrogen fuel is recovered by the Decom unit 210. As further shown in FIG. 5A, cassette 505 includes a memory chip 512 or other type of electronic device for retaining and processing information related to the cassette 505. The core material 510 and memory chip 512 are contained within a cassette housing 514 as shown in a plan view in FIG. 5A and a side view in FIG. 5B. As described above, core fuel material 510 may be any of a variety of Hydrogen fuel producing compounds including solid alloy and MCW, and other compounds described above. In FIG. 5C, an embodiment is shown wherein a solid alloy core material 522 is contained within cassette 520. Once cassette 520 is inserted into the Decom unit 210, a plunger or push-rod 524 manipulated by Decom unit 210 is used to push the solid alloy core material 522 out of cassette 520 for processing and recovery by Decom unit 210. In one embodiment, foil end covers allow the core material to be pushed through and out into the processing section or stacker of Decom 210. In another embodiment shown in FIG. 5D, the Decom unit 210 splits a cassette open at a predefined seam in order to access the core material 510 contained therein. Alternatively, the core material can be manually pushed into the Decom processing section. As shown in FIG. 5E, a cassette 530 is shown to contain MCW liquid core material 532. Upon insertion of cassette 530 into Decom unit 210, the MCW water is drained into the Decom unit 210 for processing and Hydrogen recovery via an outlet port on cassette 530. Referring to FIG. 5F, another embodiment of the present invention is shown wherein cassette 540 is configured with multiple interior regions 542 and 544. In the embodiment shown, a first interior region 542 stores alloy material, for example, sodium hydride. In another interior region of cassette 540, the region 544 is used for storage of MCW material or other catalysts only. In this configuration, multiple interior regions of cassette 540 can be used to retain and keep separate two different materials which may be used in later processing steps by Decom unit 210.

Figure 6:
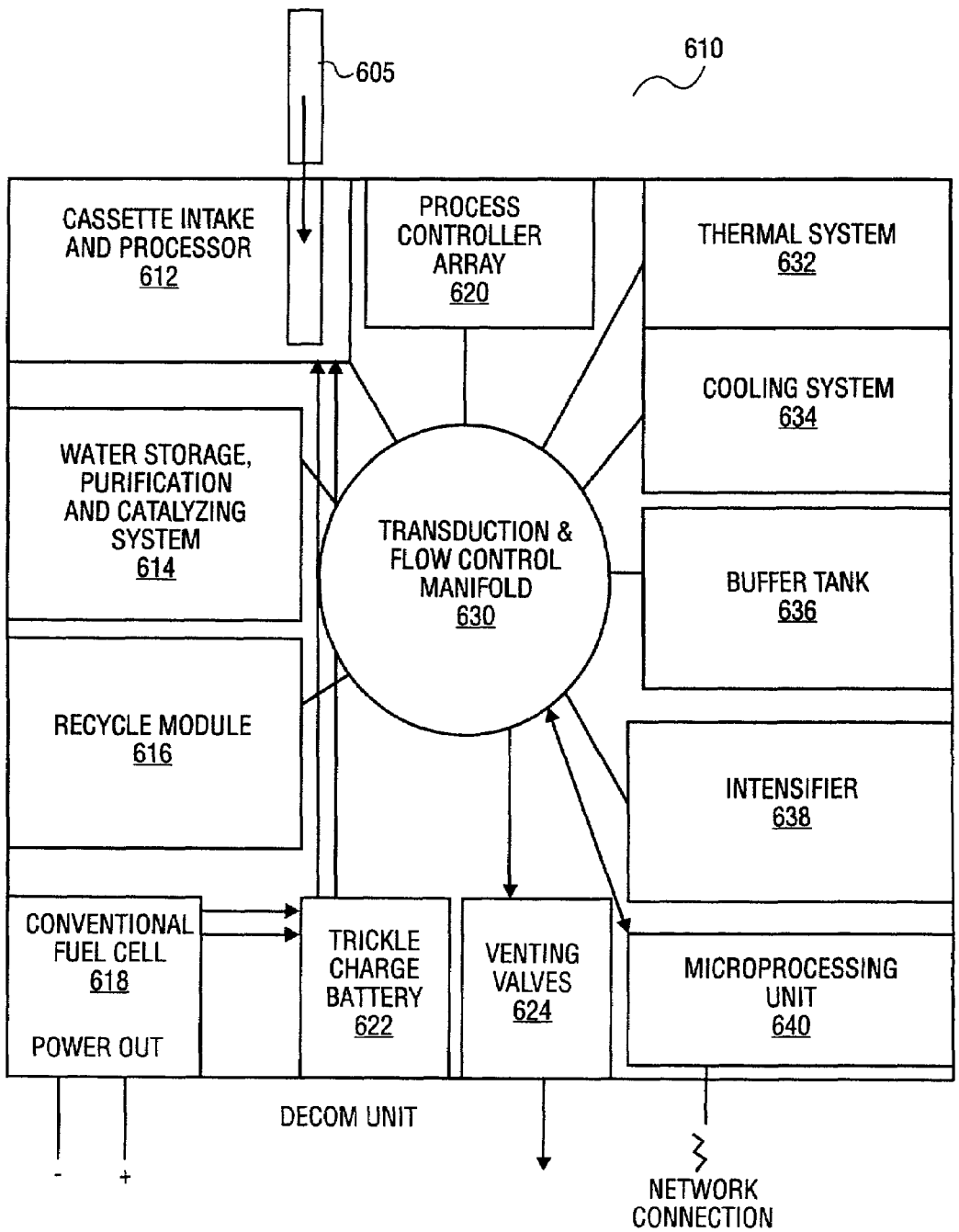
FIG. 6 illustrates the components of one embodiment of the Decom unit.

Referring now to FIG. 6, the modular structure of Decom unit 610 is illustrated. As shown in FIG. 6, Decom unit 610 includes various functional blocks, which may be implemented as removable and reconfigurable modular components. For example, cassette intake and processor 612 (i.e. receiving receptacle) receives cassettes 605 for processing the core fuel material contained therein. Depending on the type of fuel cassette being used by a particular Decom unit 610, the modular cassette intake and processor 612 may be interchanged and reconfigured to correspond with the particular type of fuel cassette 605 being used for a particular implementation. As an example, cassette intake and processor 612 may be configured to receive an MCW type fuel cassette 605. In this configuration, cassette intake and processor 612 would include necessary components for extracting the MCW core material from an input cassette 605. In another embodiment, cassette intake and processor 612 may be configured to receive solid alloy material from the input fuel cassette 605. In this configuration, cassette intake and processor 612 includes components for extracting solid alloy from the interior region of input cassette 605. Part of these components would include, in most embodiments, a push-rod 524 as shown in FIG. 5C. It will be apparent to one of ordinary skill in the art that other modular cassette intake and processor 612 units may be employed to receive and extract core fuel materials of various types from input fuel cassette 605. Decom unit 610 also includes a water storage purification and catalyzing system 614. Decom unit 610 further includes recycle module 616. Decom unit 610 also includes process controller array 620 and transduction and flow control manifold 630 for controlling processes and activities performed within Decom unit 610. Decom unit 610 may also include thermal system 632 if heat is required for particular reactions or processes. A cooling system 634 may also be provided. Buffer tank 636 is also included in Decom unit 610. The Decom unit 610 further includes intensifier 638. Data processing within Decom unit 610 is handled by microprocessing unit 640 and communication with a data network is provided via a network connection. Venting valves 624 are provided to keep pressures within tolerance. Decom unit 610 may also include a conventional fuel cell 618 which may provide a trickle charge to trickle charge battery 622. In this manner, the Decom 610 can be self-powered.

Referring now to FIG. 7, the various alternative embodiments of Decom unit 610 are illustrated. In some applications, it may be necessary to load a plurality of fuel cassettes into a Decom unit via a chip to serially provide an ongoing source of fresh fuel cassettes. One such embodiment is illustrated in FIG. 7A. In FIG. 7A, a rotary style cassette clip 710 is shown. In this manner, a plurality of cassettes 705 may be loaded into a rotary cassette clip 710 and discharged one by one into the cassette receiving receptacle of Decom unit 610. In this manner, a plurality of cassettes may be provided one after another to a Decom unit. In another alternative embodiment, FIG. 7B illustrates a stacked cassette clip 720. In this configuration, a plurality of fuel cassettes is stacked in a cassette clip 720 for sequential loading into the cassette receiving receptacle of Decom unit 610. As shown at block

Figure 7D:
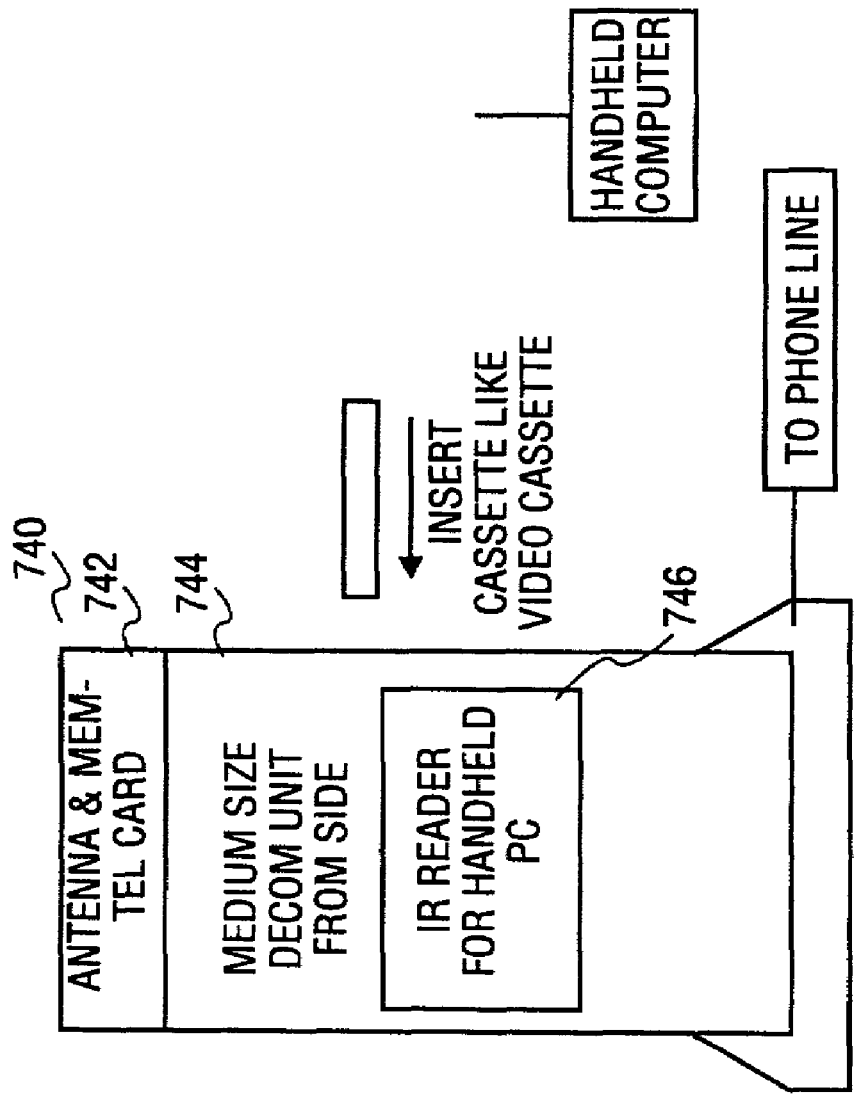

722, a fuel cassette is extracted from cassette clip 720 and provided to the cassette receiving receptacle 612 of Decom unit 610. Upon receiving the fuel cassette, Decom unit 610 opens the cassette and accesses the electronic information device 110. The information related to the received cassette is read by the Decom unit 610 and the spent cassette housing is ejected to a recycle clip or to the top of the main clip 720. The core material extracted from the input cassette is sent to the activation process in block 723. As shown in FIG. 7C, the core material from the fuel cassette is processed by the Decom unit. As a result of the process, usable hydrogen fuel 728 is output by the Decom unit and may be loaded into a conventional fuel cell 734 or used directly. Concurrently, waste products produced by the creation of the hydrogen fuel are sent to a recycling module via block 730 and/or to a recycle process module 732. In this manner, waste products of the recovery of hydrogen fuel may be captured and separately processed by Decom unit 610. One embodiment of a Decom unit 740 is illustrated in FIG. 7D. Decom unit 740 includes an antenna and telemetry receiving device 742. Telemetry receiver 742 receives information wirelessly from fuel cassettes having a memory and telemetry device 115 embedded therein. The cassette related information is sent wirelessly to the Decom unit 740 and received by telemetry receiver 742. In this manner, a Decom unit can obtain cassette specific information which may be used later in processing a particular cassette or to aggregate information related to the fuel needs of a particular application. In the embodiment shown in FIG. 7D, Decom unit 740 further includes an infrared reader 746 for receiving information from remote or hand-held computing devices, which are well-known to those of ordinary skill in the art. Decom unit 740 may also be connected to a conventional telephone line or high speed data link for connection to a network information source or network server.

Figure 8:
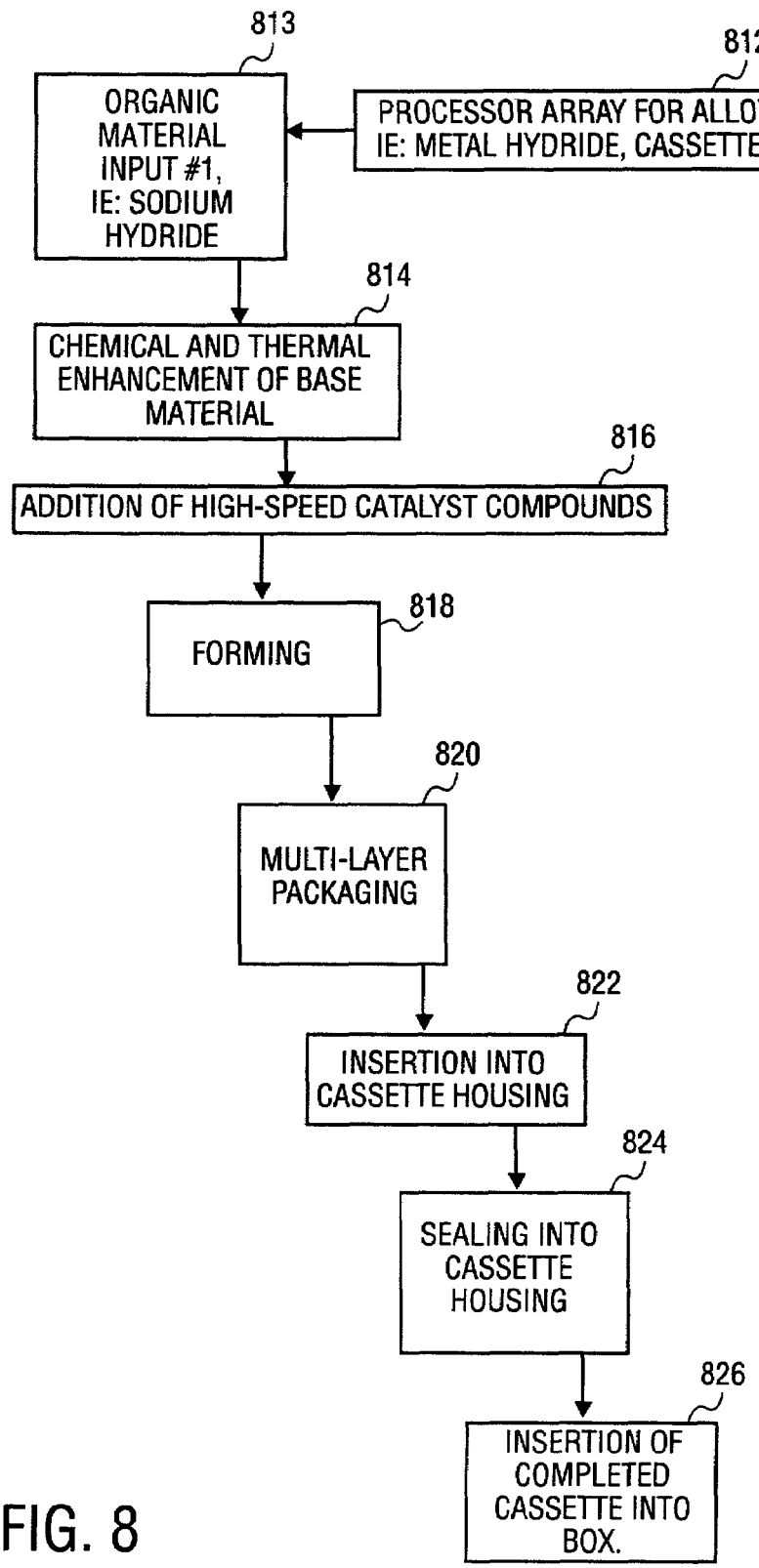
FIG. 8 illustrates the fabrication of a fuel cassette.

Referring now to FIG. 8, a process for creating a fuel cassette in the system of the present invention is illustrated. As shown in blocks 812 and 813, various materials, which will be used as core fuel material in a particular cassette type configuration, are gathered. In block 814, chemical and thermal enhancements of these base materials are performed. In block 816, high-speed catalyst compounds are added. In block 818, the processed core material is formed. Multi-layer packaging is performed in block 820. The processed material is inserted into a pre-formed cassette housing in block 822. In block 824, the core material is sealed into the cassette housing and the completed fuel cassette is inserted into a box for shipping in block 826.

Figure 9:
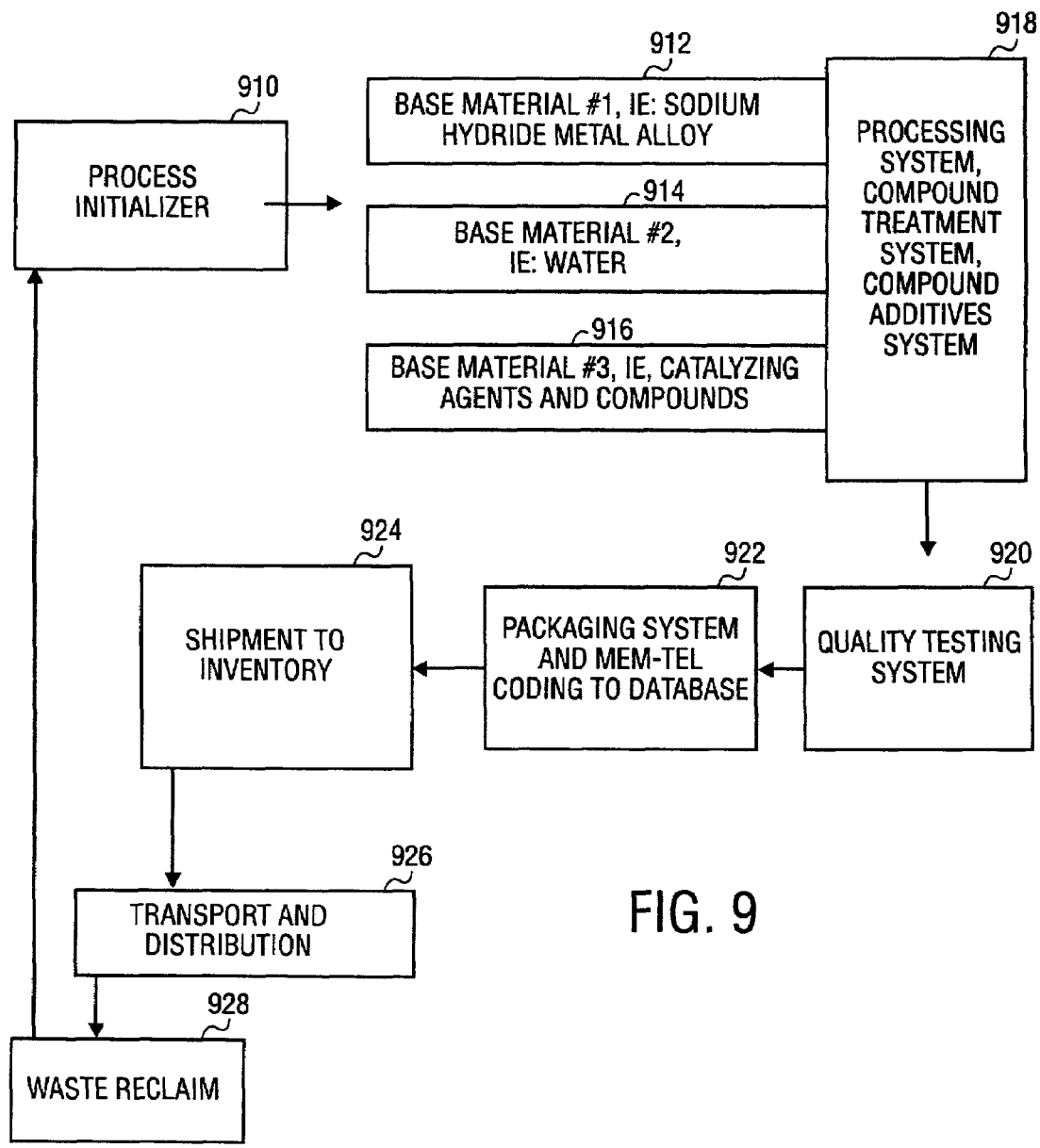
FIG. 9 illustrates the further fabrication processes of a fuel cassette.

Referring now to FIG. 9, additional or alternative steps in cassette fabrication are illustrated. In block 910, a process initializer activates the collection of base materials in blocks 912, 914 and 916. These base materials are processed in block 918 where treatment of the compounds is handled and various additives are provided. Quality testing of the compound and fabricated cassette is performed in block 920. The electronic device 110 on the newly fabricated cassette can be programmed and/or read and related information transferred to a central fuel management database in block 922. The cassette is logged as inventory in block 924 and queued for transport and distribution in block 926. Waste reclaiming is handled in block 928.

Referring now to FIG. 10, one process is illustrated for creating Massively Catalyzed Water for use as a core fuel material in the present invention. In block 1010, naturally occurring sea, lake, ground, storm, or other natural water sources are processed for purity to create natural water. In block 1012, ozonation optimization of bond angle between the $H_2$ atoms in the water molecule is handled. In block 1014, atomic amounts of specific materials are introduced. Ionization control is handled in block 1016. As a result, pure water combined with various catalysts are combined to create Massively Catalyzed Water 1020. The value of water is closely related to the bond angle between the two Hydrogen atoms in the water molecule. The ozonation process of the present invention results in a bond angle degree improvement.

Figure 11A:
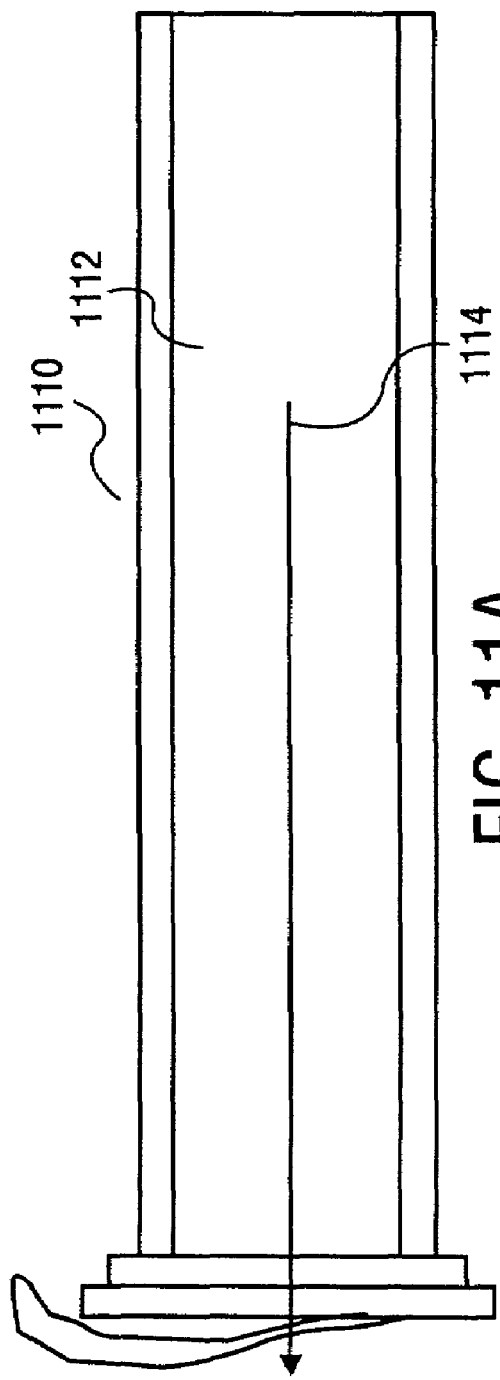
FIGS. 11A-11B illustrate an embodiment of a solid alloy type cassette.
Figure 11B:
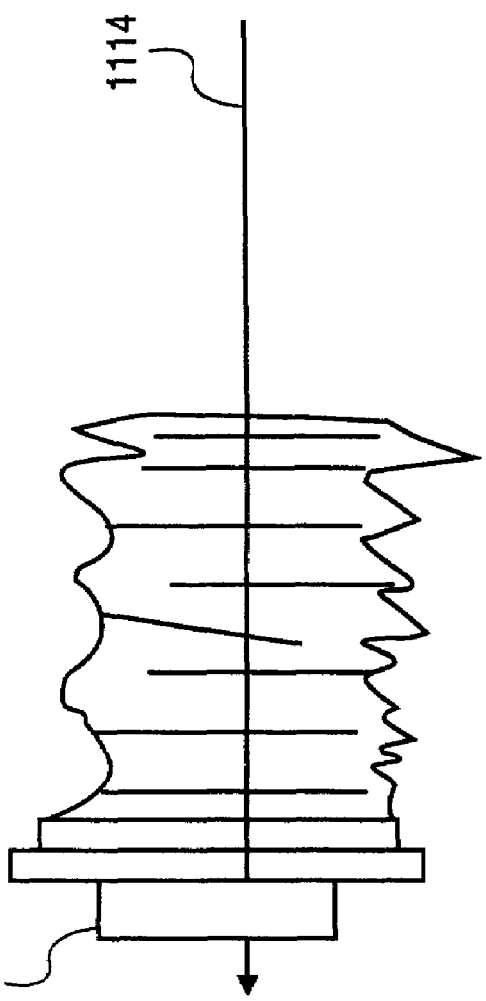

Referring now to FIGS. 11A and 11B, an example illustrates one embodiment of a cassette 110 useful for handling solid alloy core fuel material. In the illustration shown in FIG. 11A, a solid alloy type cassette 110 is shown prior to use in a Decom unit 610. Solid alloy cassette 1110 includes solid alloy core material 1112 contained therein. An outer housing of cassette 1110 may be fabricated from a collapsible material, which may be collapsed manually or by a push-rod 1114 activated by Decom unit 610. As Decom unit 610 applies pressure to push-rod 1114, the solid alloy material 1112 is ejected from cassette 1110 and made accessible to Decom unit 610 for processing.

Figure 12A:
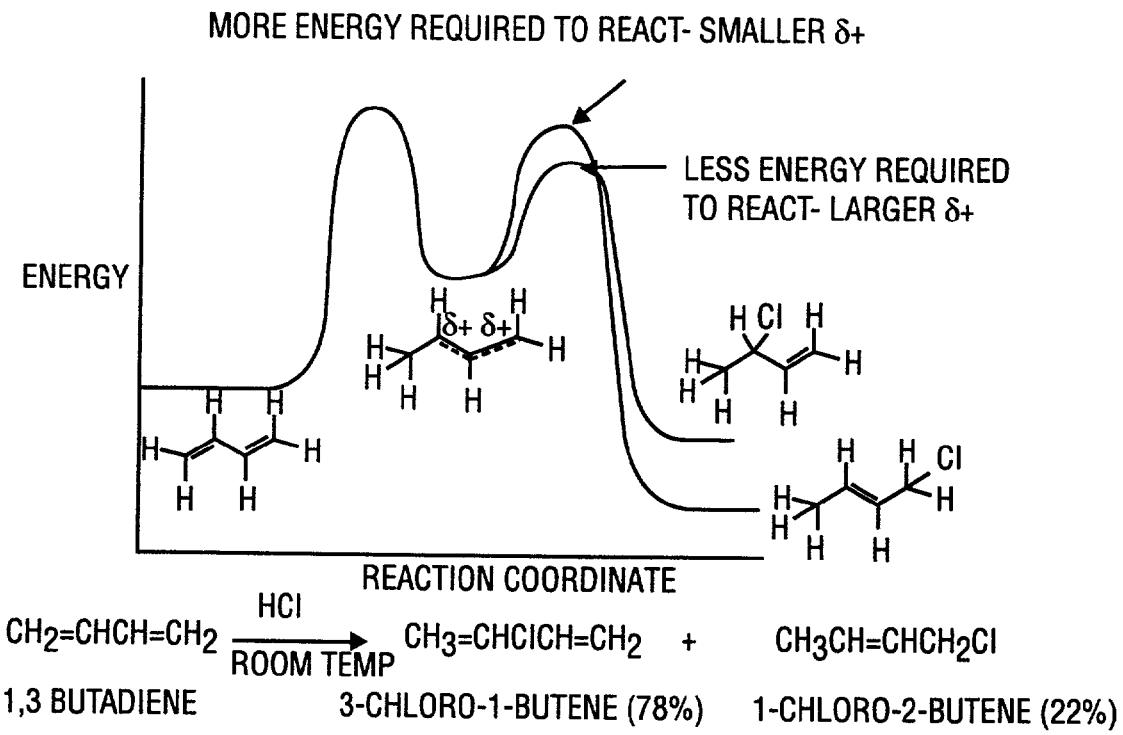
FIGS. 12A-12B illustrate electrophilic addition energy.
Figure 12B:
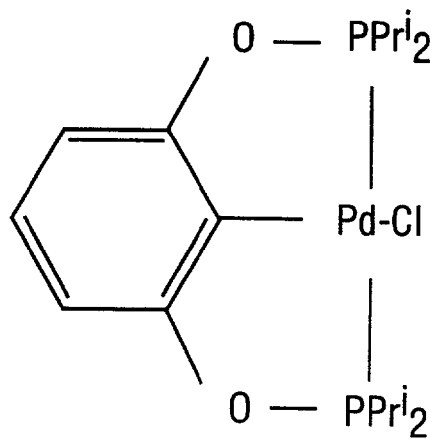

Referring to FIGS. 12A and 12B, as one part of the enhancement process, an example of electrophilic addition is illustrated. A resonance-stabilized allylic carbocation intermediate, which reacts with HCL forming two products. After the reaction proceeds, the less stable product requires less energy for formation and is formed much faster. A more stable product requires more energy and is slower in formation. We seek hereby to enhance instability in order to produce a faster formation requiring the least energy to form. We use this type of approach as one of the processes in enhancing metal hydrides and other Hydrogen fuel compression materials.

Reactions that involve kinetic control are influenced by the rates of formation, where thermodynamic control is influenced by the stability of each product. Electrophilic addition reactions can be controlled by the amount of time given for a reaction to occur. Under longer time periods, products that are formed slower and actually predominate in their reaction. An equilibrium will eventually be reached where the more stable product is present in larger amounts.

Referring now to FIG. 13, an embodiment illustrates the use of a fuel cassette, Decom unit, and fuel cell in combination to produce a means for powering vehicles. In block 1310, a fuel cassette of the present invention can be sent by conventional package delivery services to any location at which a user may wish to use Hydrogen fuel for powering a device, such as a vehicle 1318. As shipped in standard ways, cassette 1312 can be proximately located to a consumer or user and a Decom unit 1314 also proximate to the consumer/user. The consumer receives the cassette 1312 and inserts the fuel cassette into Decom unit 1314 as described earlier in this document. Decom unit 1314 processes the core material on the received cassette 1312 and produces usable Hydrogen fuel as a result of the processing performed by Decom unit 1314. This usable fuel can be output to a conventional fuel cell 1316 which may thereafter be used to power a vehicle 1318 compatible with conventional fuel cell 1316 technology. In this manner, the present invention enables the remote delivery of Hydrogen core fuel material via cassette 1312 to a location proximate to use in a Hydrogen fuel-consuming device. Thus, the present invention enables the widespread distribution of Hydrogen fuel core material using inexpensive and currently available conventional package delivery infrastructure.

Figure 14:
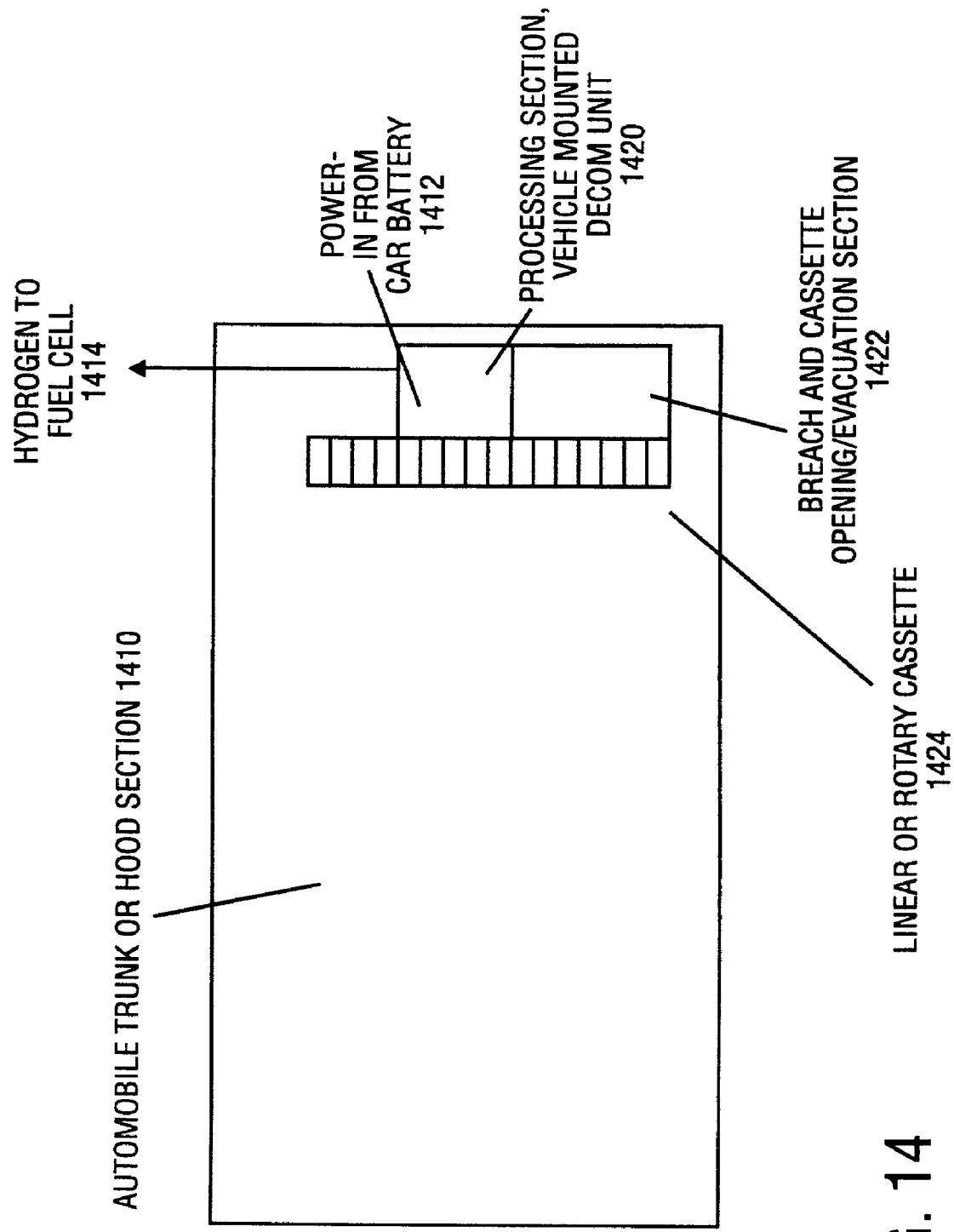

Referring now to FIG. 14, an embodiment of the present invention as used in an automobile is illustrated. As shown, an automobile trunk or hood section 1410 may be used for the storage of various components of the present invention. In particular, the vehicle may include a linear or rotary clip of Hfuel cassettes for serial loading into the vehicle mounted Decom unit 1420. An embodiment of linear or rotary clip cassette configurations was described above. In this manner, the vehicle mounted Decom unit 1420 may receive in serial fashion a plurality of Hfuel cassettes and thereby receive a steady supply of Hydrogen core fuel material for conversion to usable Hydrogen fuel, which may be output to the vehicle's conventional fuel cell 1414 or directly to the vehicle's engine. Thus, the present invention has application in powering vehicles using Hydrogen fuel.

Figure 15A:
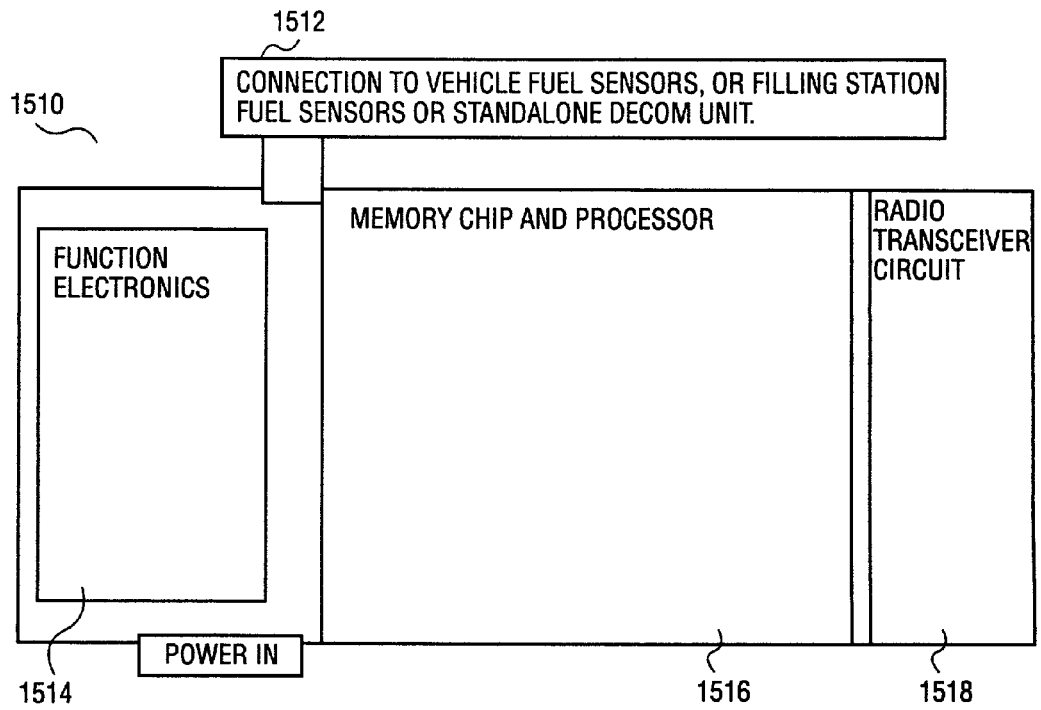
Figure 15B:
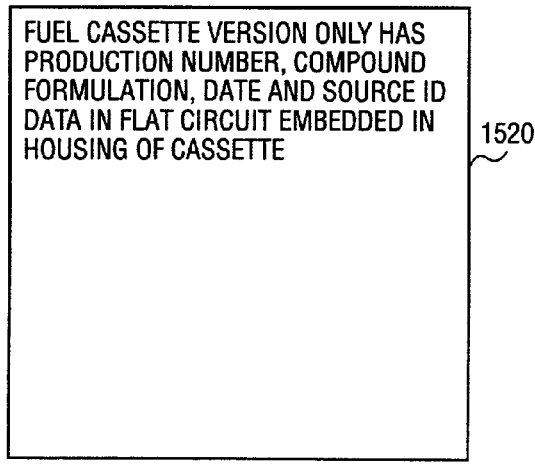

Referring now to FIGS. 15A and 15B, diagrams illustrate a configuration of electronics and memory devices, which may be configured on an embodiment of an Hfuel cassette device 1510. A memory chip and processor 1516 on cassette 1510 can be used to retain and process information related to the energy contained within cassette 1510. This information can be conveyed via radio transceiver circuit 1518 to vehicle fuel sensors or filling station fuel sensors in block 1512. Further, this cassette information may be conveyed to a remotely located stand-alone Decom unit. In this manner, information specific to a particular Hfuel cassette unit may be sent remotely to a central information collection point for processing and combination with other system information. As shown in FIG. 15B, fuel cassette 1520 may retain information including version number, production number, compound formulation, date, source identification data, and other information related to the characteristics and capacity of energy retained within the fuel cassette 1520.

Figure 16A:
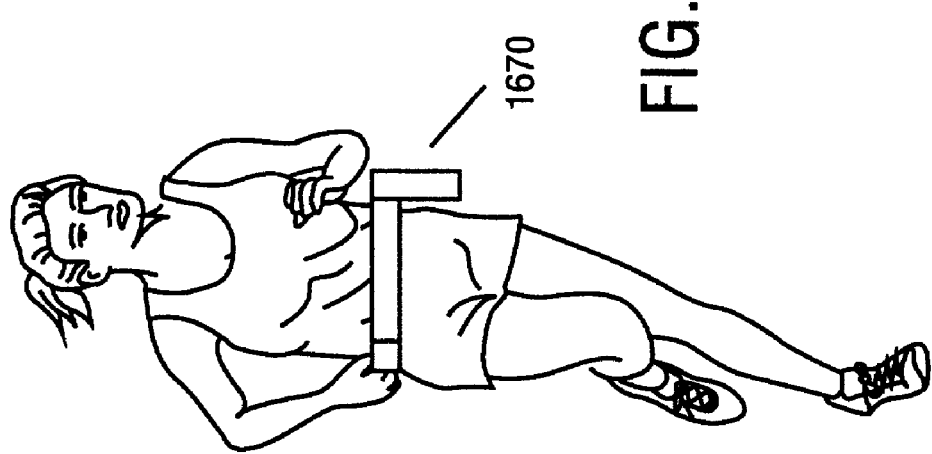
FIGS. 16A-16B illustrate a small version of the system for portable personal use.
Figure 16C:
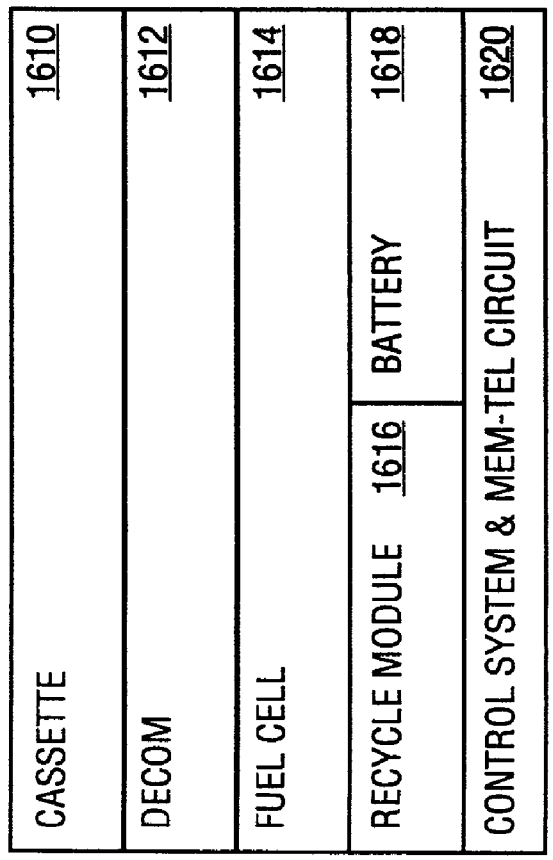
FIG. 16C illustrates a belt mounted advanced Decom unit 1670 worn by a user.
Figure 16B:
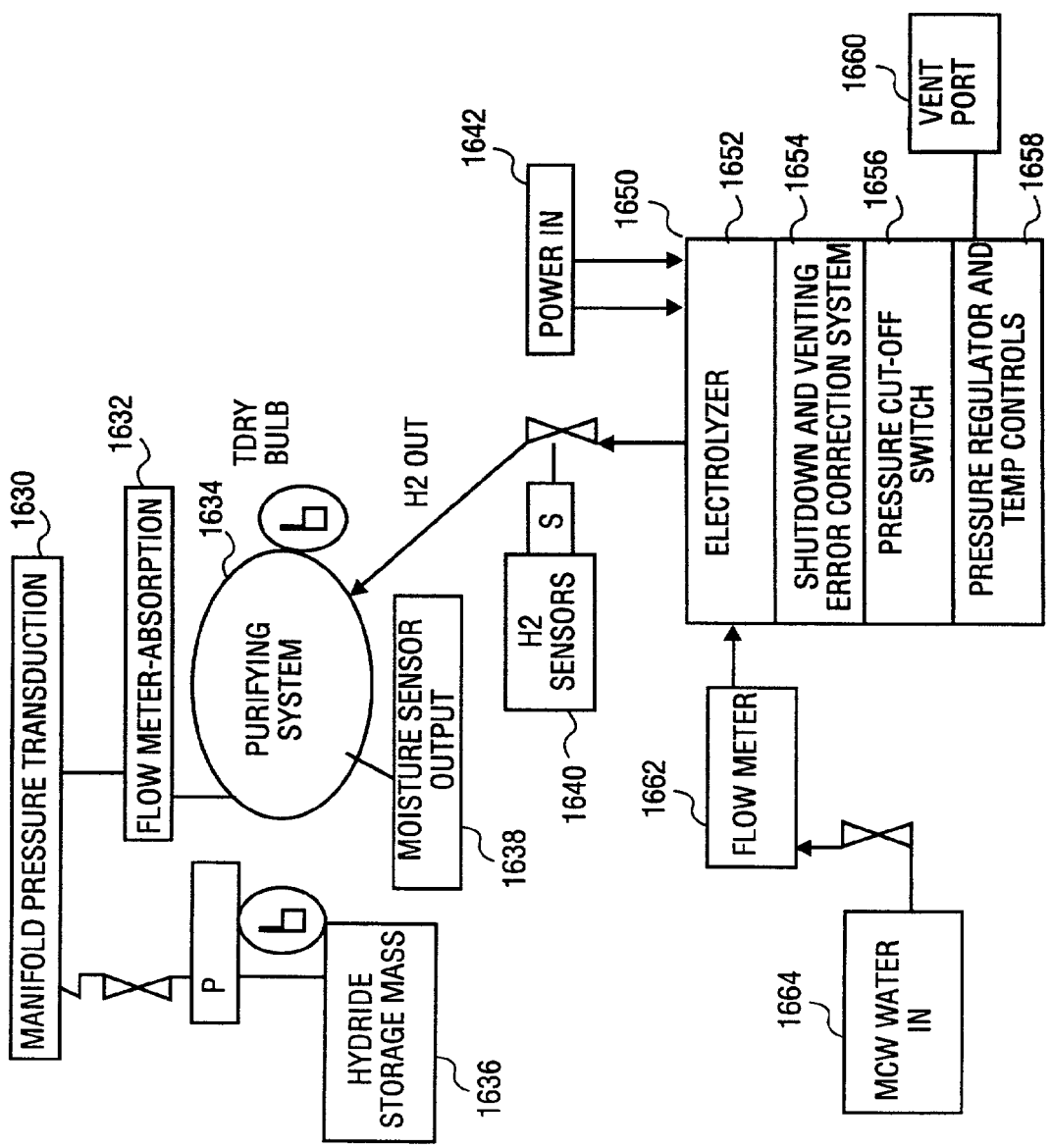

Referring now to FIGS. 16A-16C, another embodiment of the present invention is illustrated. In this embodiment, a miniaturized fuel system can be configured for attachment to the belt of a wearer as shown in FIG. 16C. Such a system may include the components illustrated in FIG. 16A. For example, the system may include a fuel cassette 1610, a small Decom unit 1612, a fuel cell 1614, a recycle module 1616, battery 1618, and a control system and memory/telemetry circuit 1620.

As shown in FIG. 16B, the system may be used to produce power in a very small and portable system configuration. In block 1630, manifold pressure transduction and flow meter absorption 1632 are provided to a purifying system 1634. Massively Catalyzed Water 1664 is provided to electrolyzer 1652 through flow meter 1662. Water is output to purifying system 1634 from electrolyzer 1652.

Thus, a cassette-based hydrogen fuel distribution and recovery method and system is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A system comprising:
a hydrogen fuel cassette, the hydrogen fuel cassette having a housing defining an interior region and a hydrogen producing material selected from the group consisting of hydrides, nanotubes, fullerenes, and glass microspheres, in the interior region; and
a hydrogen recovery unit having a receptacle to receive the hydrogen fuel cassette, the hydrogen recovery unit having electromechanics to process hydrogen producing material that has been removed from the hydrogen fuel cassette to produce hydrogen;
a telemetry device coupled with the housing of the hydrogen fuel cassette to communicate information associated with the hydrogen fuel cassette; and
a device of the hydrogen recovery unit to receive the information communicated by the telemetry device of the hydrogen fuel cassette; and
a network connection of the hydrogen recovery unit to communicate information associated with hydrogen production to a network.

2. A system comprising:
a hydrogen fuel cassette, the hydrogen fuel cassette having a housing defining an interior region and a hydrogen storage material in the interior region; and
a hydrogen recovery unit having a receptacle to receive the hydrogen fuel cassette, the hydrogen recovery unit having electromechanics to process hydrogen storage material that has been removed from the hydrogen fuel cassette to produce hydrogen.

3. The system of claim 2, wherein the hydrogen storage material comprises a material that is selected form the group consisting of hydrides, nanotubes, fullerenes, glass microspheres, and hydride slurries.

4. The system of claim 2, further comprising an electronic device coupled with the housing of the hydrogen fuel cassette to store information associated with the hydrogen fuel cassette.

5. The system of claim 4, further comprising:
a telemetry device coupled with the housing of the hydrogen fuel cassette to communicate information associated with the hydrogen fuel cassette; and
a device of the hydrogen recovery unit to receive the information communicated by the telemetry device of the hydrogen fuel cassette.

6. The system of claim 2, further comprising a reaction chamber of the recovery unit to react the hydrogen storage material that has been removed from the hydrogen filet cassette with a reactant to produce the hydrogen.

7. The system of claim 2, further comprising a multiple cassette clip containing the hydrogen fuel cassette and a plurality of other hydrogen fuel cassettes.

8. The system of claim 2, further comprising a network connection of the hydrogen recovery unit to communicate information associated with hydrogen recovery to a network.

9. The system of claim 2, further comprising a tray of the hydrogen fuel cassette to slide the hydrogen storage material out of the hydrogen fuel cassette into the hydrogen recover unit.

10. The system of claim 2, further comprising push means for pushing the hydrogen storage material out of the hydrogen fuel cassette into the hydrogen recovery unit.

11. The system of claim 2, wherein the hydrogen fuel cassette comprises a seam having a length, the seam to provide access to the hydrogen storage material.

12. The system of claim 2, further comprising a fluid in the hydrogen fuel cassette, and wherein the hydrogen fuel cassette includes an outlet port to drain the fluid.

13. The system of claim 2, further comprising:
a second interior region defined by the housing; and
a material that is different than the hydrogen storage material in the second interior region.

14. The system of claim 2, wherein the housing comprises:
a rigid mouth to couple with the receptacle of the hydrogen recovery unit; and
a flexible portion to collapse as the hydrogen storage material is pushed through the mouth into the hydrogen recovery unit.

15. The system of claim 2, wherein the hydrogen storage material in the interior region of the hydrogen fuel cassette comprises a plurality of slices of hydride.

16. The system of claim 2, wherein the electromechanics of the hydrogen recovery unit comprises a slicing system to slice a solid block of hydrogen storage material that has been removed from the hydrogen fuel cassette.

17. A system comprising:
- a cassette, the cassette having an outer casing defining an interior region and a hydrogen producing material, in the interior region; and
- a hydrogen recovery unit having a cassette intake and processor to extract the hydrogen producing material from the cassette, the hydrogen recovery unit having a reaction chamber to react the extracted hydrogen producing material to produce hydrogen.

18. The system of claim 17, wherein the hydrogen producing material comprises a hydrogen producing material that is selected from the group consisting of hydrides, nanotubes, fullerenes, glass microspheres, and hydride slurries.

19. The system of claim 17, further comprising an electronic device coupled with the casing of the cassette to store information associated with the cassette.

20. The system of claim 17, further comprising:
- an electronic device coupled with the casing of the cassette to communicate information associated with the cassette; and
- an electronic device of the hydrogen recovery unit to receive the information communicated by the electronic device of the cassette.

21. The system of claim 17, further comprising a multiple cassette clip containing the cassette and a plurality of other cassettes.

22. The system of claim 17, further comprising a network connection of the hydrogen recovery unit to communicate information associated with hydrogen production to a network.

23. The system of claim 17, further comprising a tray of the cassette to slide the hydrogen producing material out of the cassette into the hydrogen recover unit.

24. The system of claim 17, further comprising a plunger of the hydrogen recovery unit to push the hydrogen producing material out of the cassette.

25. The system of claim 17, wherein the cassette comprises a seam.

26. The system of claim 17, further comprising a fluid in the cassette, and wherein the cassette includes an outlet port to drain the fluid.

27. The system of claim 17, wherein the casing comprises:
- a rigid mouth to couple with the hydrogen recovery unit; and
- a flexible portion to collapse as the hydrogen producing material is pushed into the hydrogen recovery unit.

28. The system of claim 17, wherein the hydrogen producing material in the cassette comprises a plurality of slices of hydride.

29. The system of claim 17, wherein the hydrogen recovery unit comprises a slicing system to slice a solid block of the hydrogen producing material.

* * * * *